United States Patent
Takahama

(10) Patent No.: US 9,195,356 B2
(45) Date of Patent: Nov. 24, 2015

(54) COORDINATE INPUT DEVICE, AND ELECTRONIC DEVICE

(75) Inventor: Kengo Takahama, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 232 days.

(21) Appl. No.: 13/985,669

(22) PCT Filed: Feb. 15, 2012

(86) PCT No.: PCT/JP2012/053573
§ 371 (c)(1),
(2), (4) Date: Aug. 15, 2013

(87) PCT Pub. No.: WO2012/114965
PCT Pub. Date: Aug. 30, 2012

(65) Prior Publication Data
US 2013/0321341 A1 Dec. 5, 2013

(30) Foreign Application Priority Data
Feb. 22, 2011 (JP) ................. 2011-035916

(51) Int. Cl.
*G06F 3/044* (2006.01)
*G06F 3/041* (2006.01)

(52) U.S. Cl.
CPC .............. *G06F 3/044* (2013.01); *G06F 3/0416* (2013.01)

(58) Field of Classification Search
CPC ................. G06F 3/0416; G06F 3/044
See application file for complete search history.

(56) References Cited

U.S. PATENT DOCUMENTS

| | | | | |
|---|---|---|---|---|
| 5,905,489 A | * | 5/1999 | Takahama et al. | ............ 345/174 |
| 2010/0321331 A1 | | 12/2010 | Oda et al. | |
| 2010/0321332 A1 | | 12/2010 | Oda et al. | |
| 2010/0321333 A1 | | 12/2010 | Oda et al. | |
| 2010/0321334 A1 | | 12/2010 | Oda et al. | |
| 2012/0043140 A1 | * | 2/2012 | Peterson | ............... G06F 3/0416 178/18.06 |

FOREIGN PATENT DOCUMENTS

| | | |
|---|---|---|
| JP | 09-292950 A | 11/1997 |
| JP | 3251489 B2 | 1/2002 |
| JP | 4009005 B2 | 11/2007 |
| JP | 2011-003036 A | 1/2011 |

OTHER PUBLICATIONS

Official Communication issued in International Patent Application No. PCT/JP2012/053573, mailed on Apr. 10, 2012.

* cited by examiner

Primary Examiner — Latanya Bibbins
(74) Attorney, Agent, or Firm — Keating & Bennett, LLP

(57) ABSTRACT

A coordinate input device of the present invention includes: an M-sequence generator (12); a drive electrode driving circuit (13); and a receiving electrode selecting circuit (14) which receives a value corresponding to a coupling capacitance, an inputted coordinate position being detected in accordance with the value received by the receiving electrode selecting circuit (14), a receiving electrode group being divided into two blocks, and a first detecting section (15) and a second detecting section (16) being provided so as to correspond to the respective two blocks.

4 Claims, 29 Drawing Sheets

VALUE OF init_pat IS SET AS INITIAL VALUE OF Mseq FLIP-FLOPS,
IN A CASE WHERE set_pat = '1'.

FIG. 8

$$DM = \begin{bmatrix} 1, & 1, & 1, & 1, & 1, & 1, & 1, & -1, & -1, & -1, & -1, & -1, & -1, & 1, & \cdots & -1, & -1, & 1, & -1, & 1, & -1, & 1, & -1 \\ 1, & 1, & 1, & 1, & 1, & 1, & -1, & -1, & -1, & -1, & -1, & -1, & 1, & -1, & \cdots & -1, & 1, & -1, & 1, & -1, & 1, & -1, & 1 \\ 1, & 1, & 1, & 1, & 1, & -1, & -1, & -1, & -1, & -1, & -1, & 1, & -1, & -1, & \cdots & 1, & -1, & 1, & -1, & 1, & -1, & 1, & 1 \\ 1, & 1, & 1, & 1, & -1, & -1, & -1, & -1, & -1, & -1, & 1, & -1, & -1, & -1, & \cdots & -1, & 1, & -1, & 1, & -1, & 1, & 1, & 1 \\ & & & & & & & \vdots & & & & & & & & & & & & & & & \\ -1, & 1, & 1, & 1, & 1, & 1, & 1, & 1, & -1, & -1, & -1, & -1, & -1, & -1, & \cdots & 1, & -1, & -1, & 1, & -1, & 1, & -1, & 1 \end{bmatrix}$$

M-SEQUENCE RECONSTRUCTING TIMING
SCANNING OF DRIVE ELECTRODE SIDE (SELECTION OF DRIVE ELECTRODES BY M-SEQUENCE)

COORDINATE INPUT DEVICE, AND ELECTRONIC DEVICE

TECHNICAL FIELD

The present invention relates to a coordinate input device used for a computer, an information processing device, or the like.

BACKGROUND ART

A touch panel is known as a coordinate input device used for a computer, an information processing device, or the like.

As a general touch panel, a projection capacitance two-dimensional touch panel is known. The projection capacitance two-dimensional touch panel has various problems as below.

According to the projection capacitance two-dimensional touch panel, an air-gap, a protective plate, and the like are normally provided on a sensor section. This causes a signal to be received by the sensor section to be smaller. Therefore, an SN of a detection signal cannot be sufficiently obtained and, accordingly, the detection signal is undistinguishable from an electric field noise or a thermal noise radiated from another device. It follows that a practical detection accuracy cannot be obtained. As a result, the following problems occur. That is, a hover operation serving as an extended function of the touch panel, and a finger direction detecting function cannot be carried out. Further, an input function with use of a pen having a tip with a small area cannot be carried out.

Drive electrodes (whose number is M) and receiving electrodes (whose number is N) have M×N intersections. According to a pulse scan method, the intersections are detected one by one in time series. In view of the circumstances, it is necessary to detect each of the intersections in a short time. Therefore, in a case where a panel is larger in size and more intersections are accordingly detected, a problem further occurs such that the SN of the detection signal cannot be sufficiently obtained.

Note that, in a case where the intersections are detected independently of driving of a display so as to secure a sufficient detection time, the projection capacitance two-dimensional touch panel is subjected to electrostatic radiation while display electrodes of the display are being driven. Unfortunately, this causes a noise in touch panel detection.

In view of the circumstances, for example, Patent Literatures 1 and 2 each disclose a proposal of a method for increasing, by M-sequence driving, the number of intersections to be detected during one clock scan so as to secure a sufficient detection time.

The M-sequence driving enables an increase in number of the intersections to be detected during one clock-scan. This allows a longer detection time for each of the intersections. As a result, it is possible to increase the SN of the detection signal.

This makes it possible to solve the various problems caused by the problem such that the SN of the detection signal cannot be sufficiently obtained.

CITATION LIST

Patent Literature 1
Japanese Patent No. 3251489 B2 (Registered Date: Nov. 16, 2001)
Patent Literature 2
Japanese Patent No. 4009005 B2 (Registered Date: Sep. 7, 2007)

SUMMARY OF INVENTION

Technical Problem

According to the conventional M-sequence driving, it is possible to increase the SN of the detection signal by making the detection time for each of the intersections longer. However, the conventional M-sequence driving has the following problem. That is, since a coordinate position is specified by measuring coupling capacitances in accordance with detection signals from all of the receiving electrodes, a process for detecting the coordinate position requires a longer time.

The present invention has been made in view of the above problems, and an object of the present invention is to provide a coordinate input device capable of increasing an SN of a detection signal at an intersection of a drive electrode and a receiving electrode, while reducing a time required for a process for detecting a coordinate position.

Solution to Problem

In order to attain the above object, a coordinate input device of the preset invention includes: a drive electrode group composed of drive electrodes which are arranged on a substrate at regular intervals; a receiving electrode group composed of receiving electrodes which are arranged at regular intervals so as to be insulated from and intersect with the drive electrodes; a pseudorandom signal generating means for generating a pseudo-random signal having a pulse-like autocorrelation function; a drive electrode driving circuit which sequentially applies, to each of the drive electrodes, a voltage synchronized with a cycle of the pseudorandom signal; a receiving electrode selecting circuit which is connected to the receiving electrode group and receives a value corresponding to a coupling capacitance obtained by capacitive coupling between the drive electrode group and the receiving electrode group; and detecting means for detecting an inputted coordinate position in accordance with the value received by the receiving electrode selecting circuit, the receiving electrode group being divided into N blocks (N is a positive number not less than two), and the N blocks being provided with the respective detecting means.

According to the above configuration, the voltage synchronized with the cycle of the pseudorandom signal is applied to the drive electrode group. This enables an increase in number of intersections, of the drive electrodes and the receiving electrodes, to be detected during one cross-scan. As a result, it is possible to make a detection time for each of the intersections longer and, accordingly, possible to increase an SN of a detection signal.

Furthermore, the receiving electrode group is divided into the N blocks (N: a positive number of 2 or more) and the N blocks are provided with the respective detecting means, meanwhile the drive electrode group, to which the voltage synchronized with the cycle of the pseudorandom signal is applied, is provided as an electrode group common among the N blocks. This allows each of the detecting means to simultaneously measure a coupling capacitance obtained from a corresponding one of the N blocks into which the receiving electrode group is divided.

Since measurement of the coupling capacitance at each of the intersections can be carried out with respect to the divided blocks in parallel, it is possible to speed up the measurement of the coupling capacitance. As a result, it is possible to considerably reduce a time required for a process for detecting the coordinate position (detection time).

Therefore, according to the coordinate input device having the configuration, it is possible to increase the SN of the detection signal at each of the intersections of the drive electrodes and the receiving electrodes, while reducing the time required for a process for detecting the coordinate position.

Advantageous Effects of Invention

In order to attain the above object, an coordinate input device of the preset invention includes: a drive electrode group composed of drive electrodes which are arranged on a substrate at regular intervals; a receiving electrode group composed of receiving electrodes which are arranged at regular intervals so as to be insulated from and intersect with the drive electrodes; a pseudorandom signal generating means for generating a pseudo-random signal having a pulse-like autocorrelation function; a drive electrode driving circuit which sequentially applies, to each of the drive electrodes, a voltage synchronized with a cycle of the pseudorandom signal; a receiving electrode selecting circuit which is connected to the receiving electrode group and receives a value corresponding to a coupling capacitance obtained by capacitive coupling between the drive electrode group and the receiving electrode group; and detecting means for detecting an inputted coordinate position in accordance with the value received by the receiving electrode selecting circuit, the receiving electrode group being divided into N blocks (N is a positive number not less than two), and the N blocks being provided with the respective detecting means. With this configuration, it is possible to increase an SN of a detection signal at each of intersections of the drive electrodes and the receiving electrodes, while reducing a time required for a process for detecting the coordinate position.

BRIEF DESCRIPTION OF DRAWINGS

FIG. 8 is a view illustrating a reverse matrix IM.

Figure 25:
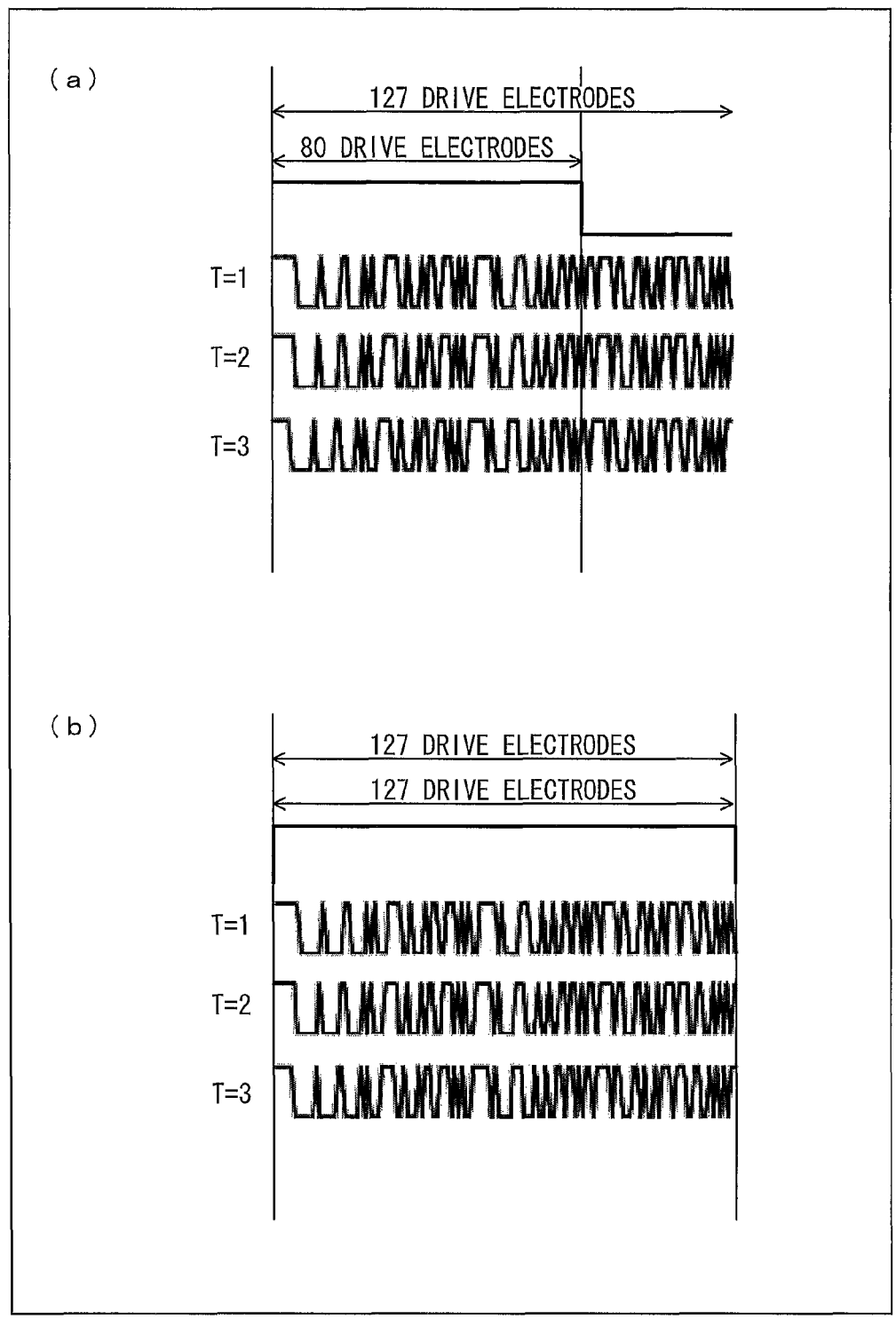

(a) of FIG. 25 is a waveform chart of an M-sequence signal in a case where the number of drive electrodes is 80. (b) of FIG. 25 is a waveform chart of an M-sequence signal in a case where the number of the drive electrodes is 127.

Figure 26:
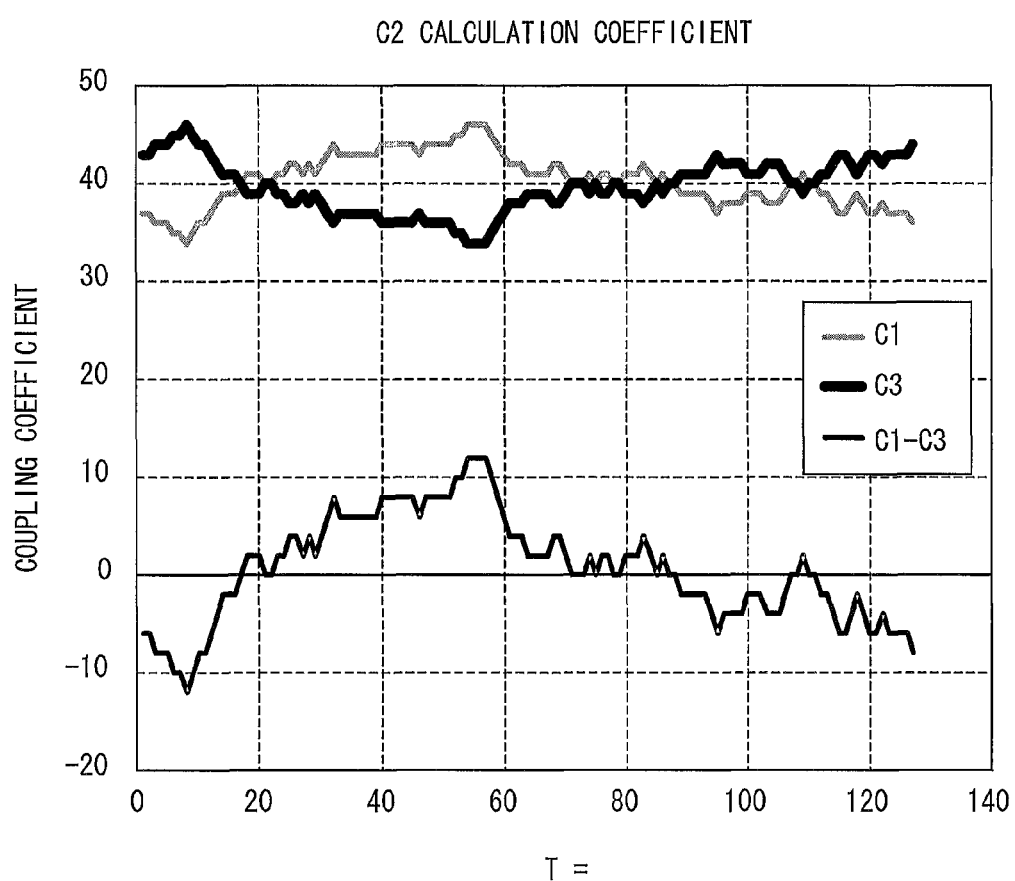

FIG. 26 is a graph illustrating a relationship between a coupling coefficient and a time in a case where the number of the drive electrodes is 80.

Figure 27:
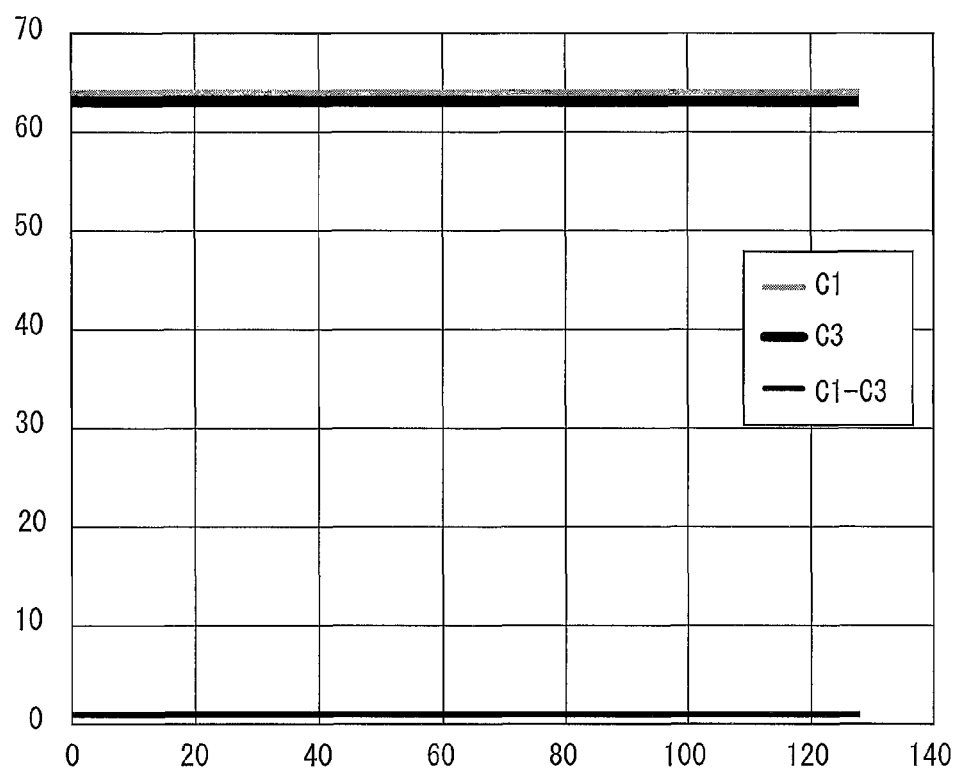

FIG. 27 is a graph illustrating a relationship between a coupling coefficient and a time in a case where the number of the drive electrodes is 127.

Figure 28:
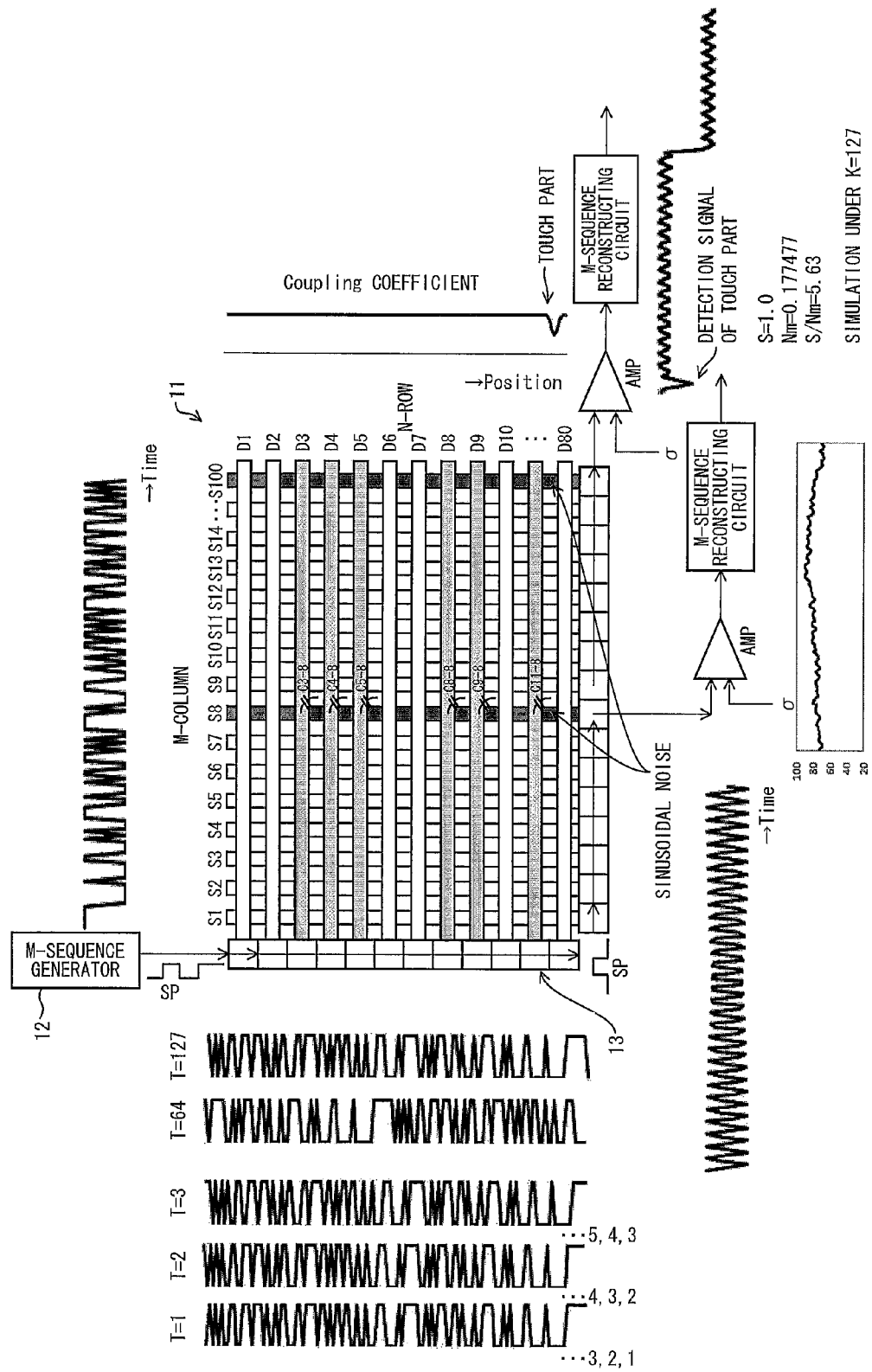

FIG. 28 is a block diagram, for explaining an effect of the present invention, schematically illustrating a configuration of a coordinate input device.

Figure 29:
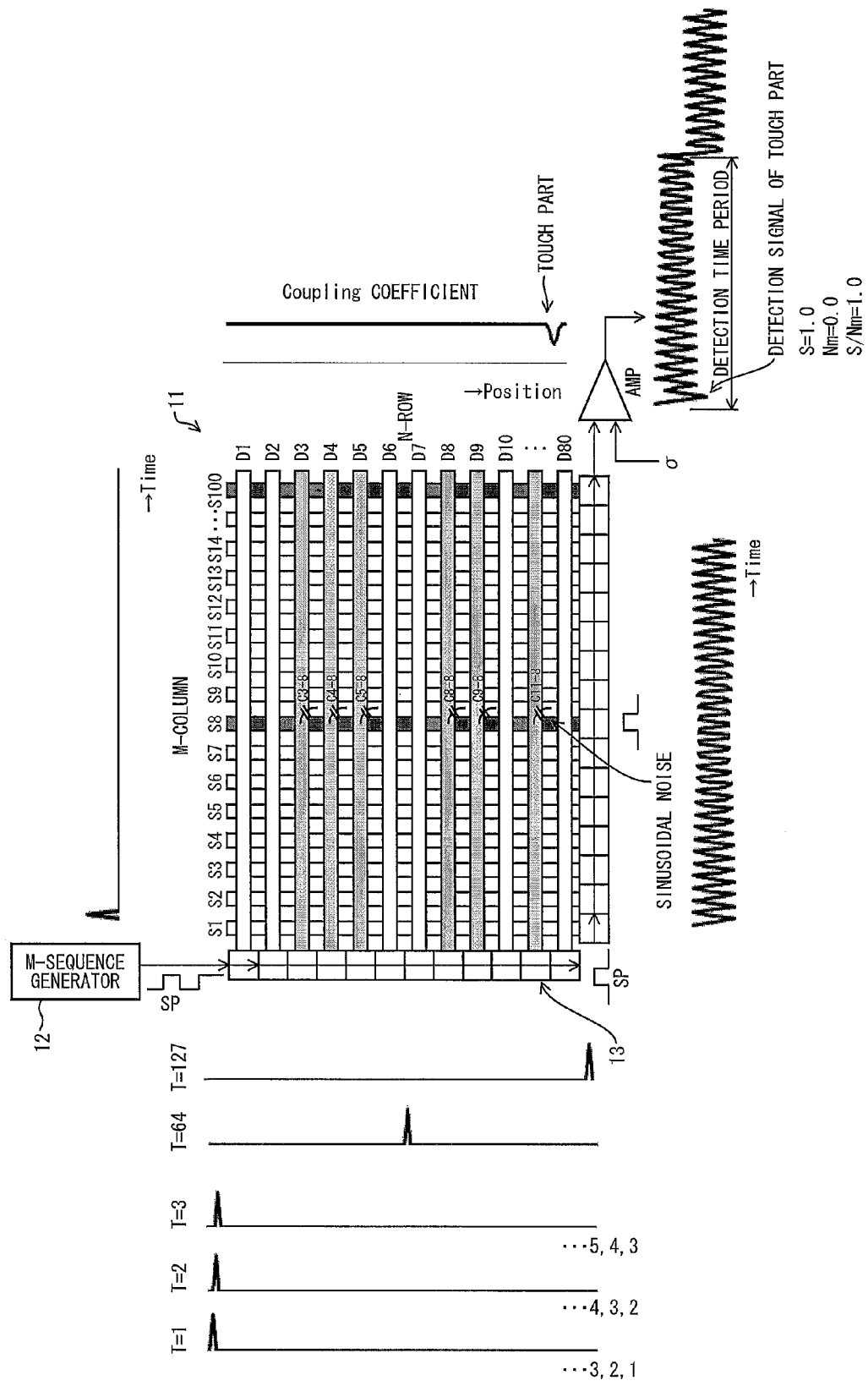

FIG. 29 is a block diagram, for explaining an effect of the present invention by comparison, schematically illustrating a configuration of a coordinate input device.

DESCRIPTION OF EMBODIMENTS

[Embodiment 1]

The following description will discuss an embodiment of the present invention.

<Description of Overall Configuration of Coordinate Input Device>

Figure 1:
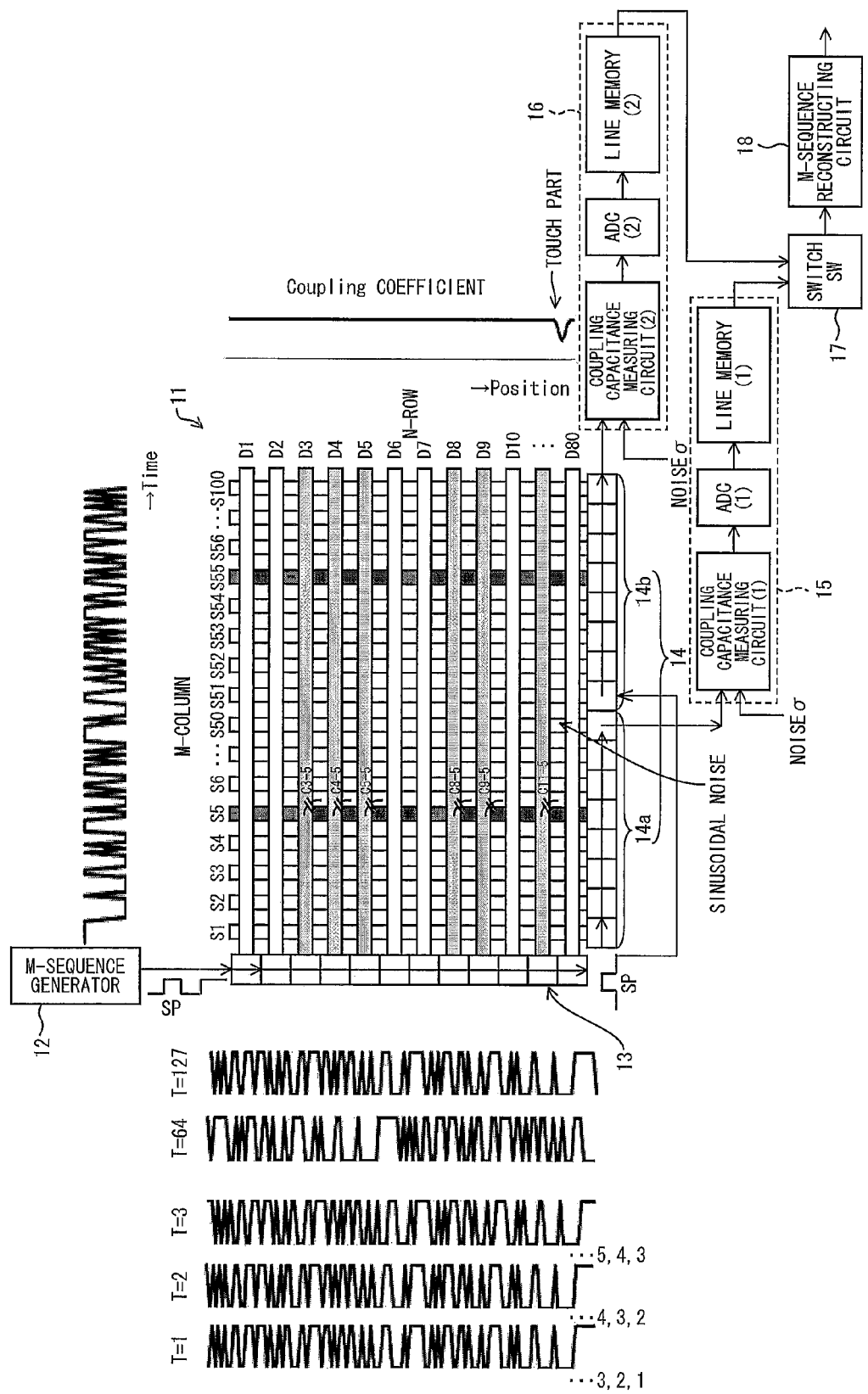
FIG. 1 is a block diagram schematically illustrating a configuration of a coordinate input device in accordance with an embodiment.

FIG. 1 is a block diagram schematically illustrating a configuration of a coordinate input device in accordance with Embodiment 1.

The coordinate input device in accordance with the Embodiment 1 includes: a sensor section 11; an M-sequence generator (pseudorandom signal generating means) 12; a drive electrode driving circuit (drive electrode driving means) 13; a receiving electrode selecting circuit (receiving electrode selecting means) 14; a first detecting section (detecting means) 15; a second detecting section (detecting means) 16;

a switch SW 17; and an M-sequence reconstructing circuit (pseudorandom signal reconstructing means) 18 (see FIG. 1).

The sensor section 11 includes (i) drive electrodes D1 to D80 (a drive electrode group) which are arranged on a substrate (not illustrated) at regular intervals in a row direction and (ii) receiving electrodes S1 to S100 (a receiving electrode group) which are arranged at regular intervals in a column direction so as to be insulated from and intersect with the drive electrodes.

The receiving electrode group is divided into N blocks (N is a positive number of 2 or more). Note here that Embodiment 1 will discuss a case where N=2, that is, an example in which the receiving electrode group composed of the receiving electrodes S1 to S100 is divided into a block of S1 to S50 and a block of S51 to S100.

The M-sequence generator 12 generates a binary pseudorandom signal having a pulse-like autocorrelation function and then supplies the generated binary pseudorandom signal to the drive electrode driving circuit 13.

The drive electrode driving circuit 13 sequentially applies, to each of the drive electrodes D1 to D80 of the drive electrode group, a voltage synchronized with a cycle of the pseudorandom signal. For example, the drive electrode driving circuit 13 includes a shift register made up of flip-flops, which shifts a signal in synchronization with the cycle of the pseudorandom signal generated by the M-sequence generator 12. The drive electrode driving circuit 13 applies a voltage V0 only to the drive electrode corresponding to the flip-flop having an output of '1'. The drive electrode corresponding to the flip-flop having an output of '0 (zero)' is connected to a GND. A configuration of the drive electrode driving circuit 13 will be specifically described later. A pattern of the pseudorandom signal generated by the M-sequence generator 12 is shifted, step by step, downward in accordance with an elapsed time T (T=1, 2, 3, ..., 64, ..., 127), so that it is determined which of the drive electrodes Dx is activated (see FIG. 1).

The receiving electrode selecting circuit 14 is made up of a first receiving electrode selecting section 14*a* and a second receiving electrode selecting section 14*b* which are connected to the respective two blocks into which the receiving electrode group is divided. Each of the first receiving electrode selecting section 14*a* and the second receiving electrode selecting section 14*b* receives a value corresponding to a coupling capacitance obtained by capacitive coupling between the drive electrode group (the drive electrodes D1 to D80) and the receiving electrode group (the receiving electrodes S1 to S100). Each of the first receiving electrode selecting section 14*a* and the second receiving electrode selecting section 14*b* includes, for example, a shift register made up of flip-flops, as in the case of the drive electrode driving circuit 13. Only the receiving electrode corresponding to the flip-flop having an output of '1' is connected via an analog switch to an input terminal of a coupling capacitance measuring circuit (described later). A configuration of the receiving electrode selecting circuit 14 will be specifically described later.

The first detecting section 15 (i) detects, in accordance with a signal corresponding to a receiving electrode selected by the first receiving electrode selecting section 14*a*, data modulated by the pseudorandom signal containing information on an inputted coordinate position and (ii) stores therein the detected data. Specifically, the first detecting section 15 includes a coupling capacitance measuring circuit (1), an ADC (1), and a line memory (storing section) (1).

The coupling capacitance measuring circuit (1), which is constituted by a switched-capacitor integrator, supplies, as an analog value, a coupling capacitance between a selected drive electrode and a selected receiving electrode to the ADC (1) in a subsequent stage (described later).

The ADC (1) converts, into a digital signal, the analog signal supplied from the coupling capacitance measuring circuit (1), and then supplies the digital signal to the line memory (1) in a subsequent stage.

The line memory (1) temporarily maintains a result of analog-digital conversion which result is obtained by the ADC (1). The line memory (1) then supplies the result of analog-digital conversion to the M-sequence reconstructing circuit 18 in a subsequent stage by carrying out a time-sharing process with a line memory of the other block.

The second detecting section 16 (i) detects, in accordance with a signal corresponding to a receiving electrode selected by the first receiving electrode selecting section 14*b*, data modulated by the pseudorandom signal containing information on an inputted coordinate position and (ii) stores therein the detected data. Specifically, the second detecting section 16 includes a coupling capacitance measuring circuit (2), an ADC (2), and a line memory (2). Since the coupling capacitance measuring circuit (2), the ADC (2), and the line memory (2) have respective functions identical to those of the coupling capacitance measuring circuit (1), the ADC (1), and the line memory (1), a description thereof is omitted here.

The detecting sections, each including the coupling capacitance measuring circuit, the ADC, and the line memory, correspond to the respective blocks of the receiving electrode group. Therefore, N pairs of the detecting sections are provided. Note here that, since Embodiment 1 discusses the example in which N=2, two pairs of the detecting sections (the first detecting section 15 and the second detecting section 16) are provided.

A detection result supplied from each of the first detecting section 15 and the second detecting section 16 is sequentially supplied to the M-sequence reconstructing circuit 18 while the first detecting section 15 and the second detecting section 16 are being switched in time series by the switch SW 17.

The M-sequence reconstructing circuit 18 reconstructs, by time-sharing for each of the blocks of the receiving electrode group, sequential outputs which are detected from each of the blocks of the receiving electrode group and then supplied from the line memory of the detecting section corresponding to the each of the blocks. The M-sequence reconstructing circuit 18 will be specifically described later.

According to the coordinate input device having the configuration, since the receiving electrode group composed of the receiving electrodes S1 to S100 is divided into the N=2 blocks, coupling capacitance detection results of the N=2 blocks are simultaneously digitalized and stored in the respective line memories. That is, it is possible to obtain, in parallel, the coupling capacitance detection results of the two blocks.

Further, the drive electrode group composed of the drive electrodes D1 to D80 extends over all of the blocks of the receiving electrodes. This makes it possible to simultaneously drive the drive electrodes by an M-sequence pattern.

This yields an effect of allowing a detection speed, which could not be made higher due to a restriction of a time constant of each of a drive electrode and a receiving electrode (coupling capacitance C between a resistance value R and another), to be N=2 times higher than the detection speed. That is, as N is increased, the detection speed accordingly increases.

<Electrode Structure and Shift Register of Coordinate Input Device>

Figure 2:
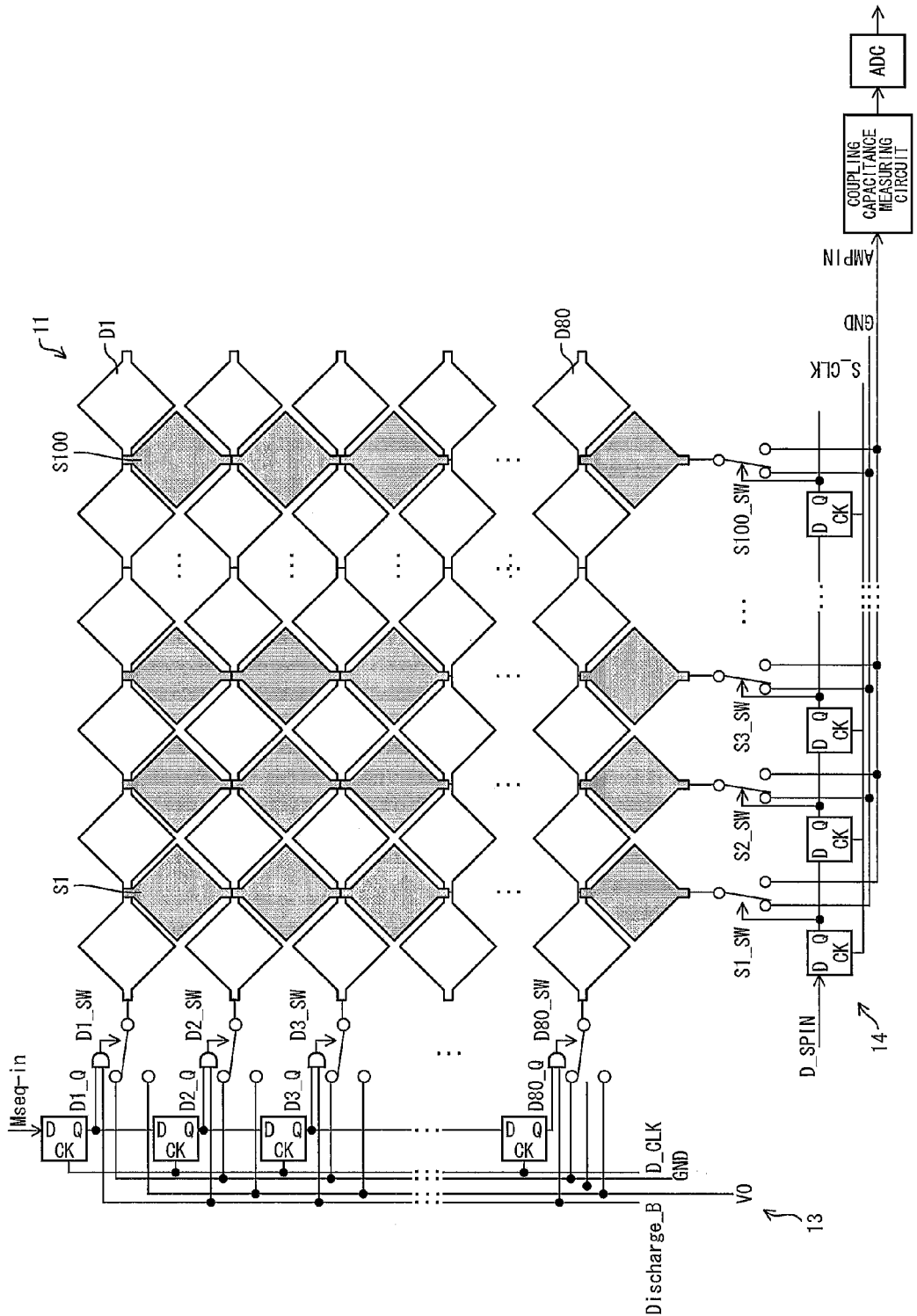
FIG. 2 is a view schematically illustrating an electrode structure and configurations of driving circuits, of the coordinate input device.

FIG. 2 is a view schematically illustrating an electrode structure and configurations of driving circuits, of the coordinate input device. Note here that for convenience of explanation, FIG. 2 illustrates a state in which the receiving electrode group is not divided into blocks.

According to the drive electrode driving circuit 13, the flip-flops are connected in series, and the drive electrode driving circuit 13 controls an analog switch connected to each of the drive electrodes D1 to D80 in response to a signal obtained, by AND operation, from (i) an output Q of a corresponding one of the flip-flops and (ii) Discharge_B (see FIG. 2).

Only in a case where the output Q='1' and Discharge_B='1', the voltage V0 is applied to a drive electrode. In the other cases, the drive electrode is connected to the GND.

To the flip-flop D in the first stage, an output of the M-sequence generator, i.e., an M-sequence signal is inputted. A pattern of the M-sequence signal is shifted downward step by step at each rise of D_CLK.

According to the receiving electrode selecting circuit 14, the flip-flops are connected in series, and the receiving electrode selecting circuit 14 controls an analog switch via which the output Q of each of the flip-flops is connected to a corresponding receiving electrode (see FIG. 2). A signal supplied to the first flip-flop is a start-pulse D_SP, which is shifted rightward at each rise of S_CLK.

In a case where the output Q of the flip-flop is '1', the receiving electrode is connected to the coupling capacitance measuring circuit via the analog switch.

The receiving electrode corresponding to the flip-flop having the output Q of '0 (zero)' is connected to the GND. Therefore, no signal is supplied to the coupling capacitance measuring circuit from the receiving electrode corresponding to the flip-flop having the output Q of '0 (zero)'.

The start pulse (SP) has only one clock. Therefore, a signal to be shifted causes only any one of the flip-flops to have Q='1'. This allows a corresponding one of the receiving electrodes to be selected.

Figure 3:
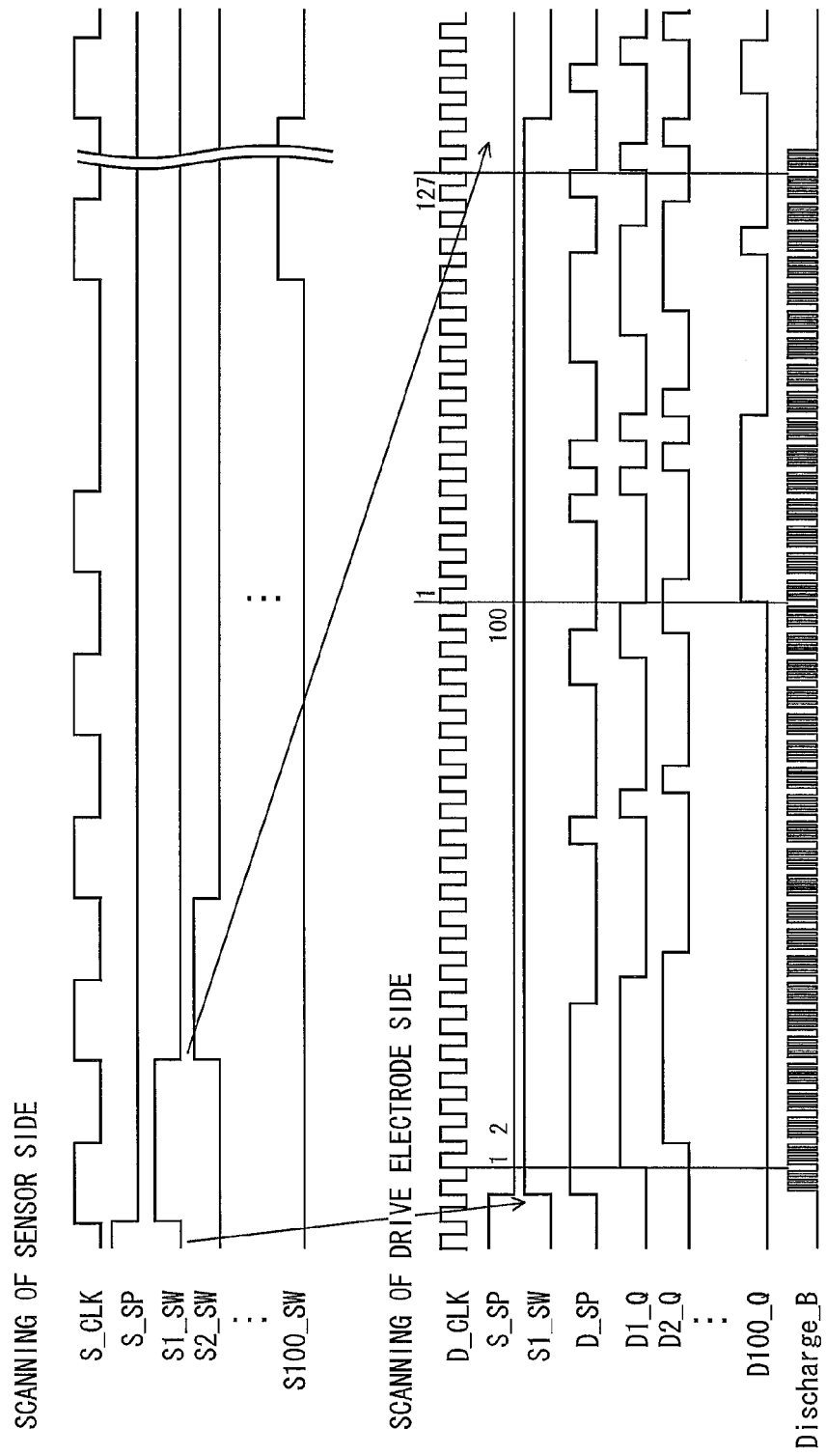
FIG. 3 is a timing diagram illustrating a timing of each signal in a case where a receiving electrode group in accordance with the embodiment is divided into blocks and detection is carried out in parallel.
Figure 4:
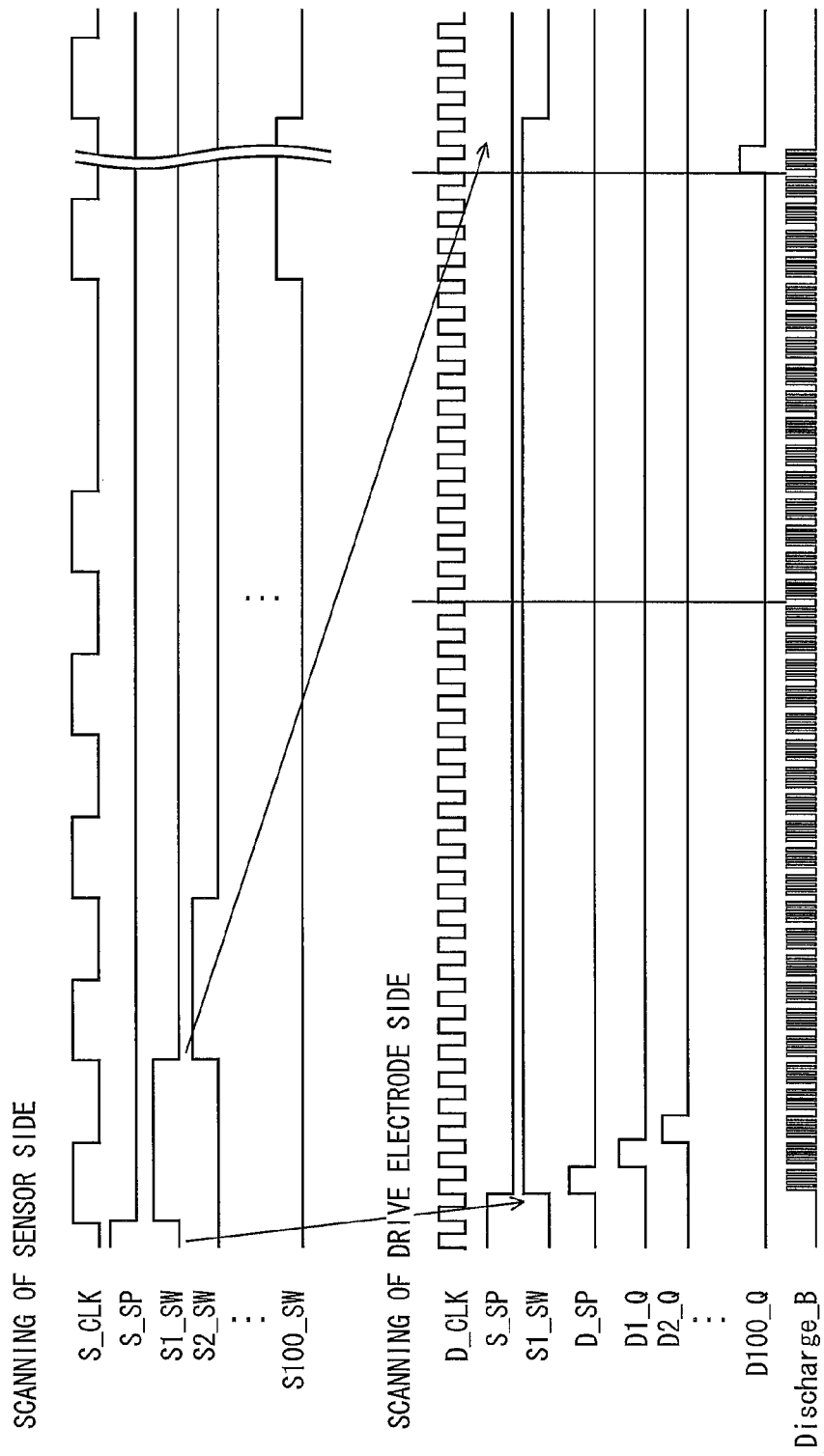
FIG. 4 is a timing diagram illustrating a timing of each signal in the case of a detection process in which the receiving electrode group is not divided into blocks.

The following description will discuss, with reference to timing diagrams illustrated in FIGS. 3 and 4, a coordinate input operation carried out by the coordinate input device having the configuration.

FIG. 3 is a timing diagram illustrating a timing of each signal in a case where the receiving electrode group of Embodiment 1 is divided into blocks and detection is carried out in parallel.

FIG. 4 is a timing diagram illustrating a timing of each signal in the case of a conventional detection process in which the drive electrodes are not scanned by the M-sequence.

First, the following description will discuss a timing of conventional scanning so as to make a technique of the present invention easy to understand.

A scan clock for a receiving electrode side is supplied as S_CLK, and a start pulse S_SP is supplied as a pulse having a width of one clock identical to that of the scan clock (see the timing diagram of FIG. 4). The receiving electrodes S1_SW, which are selected at respective rises of S_CLK, are sequentially scanned.

The following description will discuss, with reference to a timing diagram in which a time axis is enlarged, how the drive electrodes are scanned in a case where the receiving electrode S1 is selected (see a lower part of FIG. 4).

In a case where the receiving electrode Si is selected, the drive electrode start pulse D_SP is supplied to the shift register for reception on a drive electrode side. The drive electrode start pulse D_SP is shifted through the shift register at each rise of the drive electrode driving clock D_CLK.

According to the example of the conventional scanning, only one of the drive electrodes is active. Meanwhile, M-sequence scanning is different from the conventional scanning in that the M-sequence scanning causes two or more of the drive electrodes to be simultaneously active (described later).

The voltage V0 is applied to the drive electrode corresponding to the flip-flop having the output Q of '1' in a case where Discharge_B is '1'. This V0 potential is detected by the switched-capacitor integrator (described later).

Note here that FIG. 4 illustrates a case where Discharge_B changes by four pulses during one pulse of the start-pulse D_SP supplied to the drive electrode.

Next, the following description will discuss the technique of the present invention with reference to the timing diagram illustrated in FIG. 3.

According to the M-sequence scanning of the present invention, the drive electrodes are scanned in the M-sequence pattern.

That is, the M-sequence pattern supplied to the shift register on the drive electrode side is sequentially shifted at each rise of D_CLK (see FIG. 3).

Assume here that the coordinate input device includes 100 drive electrodes. In a case where first 100 clocks are ended, the drive electrodes corresponding to the M-sequence pattern are selected, as active electrodes, in a descending order from the 100th drive electrode. The coupling capacitances are obtained from 127 data which are detected from the (100+1)st clock to the (100+127)th clock.

According to the M-sequence scanning, the coupling capacitance measuring circuit can be realized by a circuit and a drive timing identical to those used for pulse scanning. However, detection starts at the 101st clock which is a timing at which first data is detected (see the timing diagram illustrated in FIG. 3).

As in the case of the description of the conventional scanning, FIG. 3 also illustrates a case where Discharge_B changes by four pulses during one pulse of the start-pulse D_SP supplied to the drive electrode.

<Coupling Capacitance Measuring Circuit>

Figure 5:
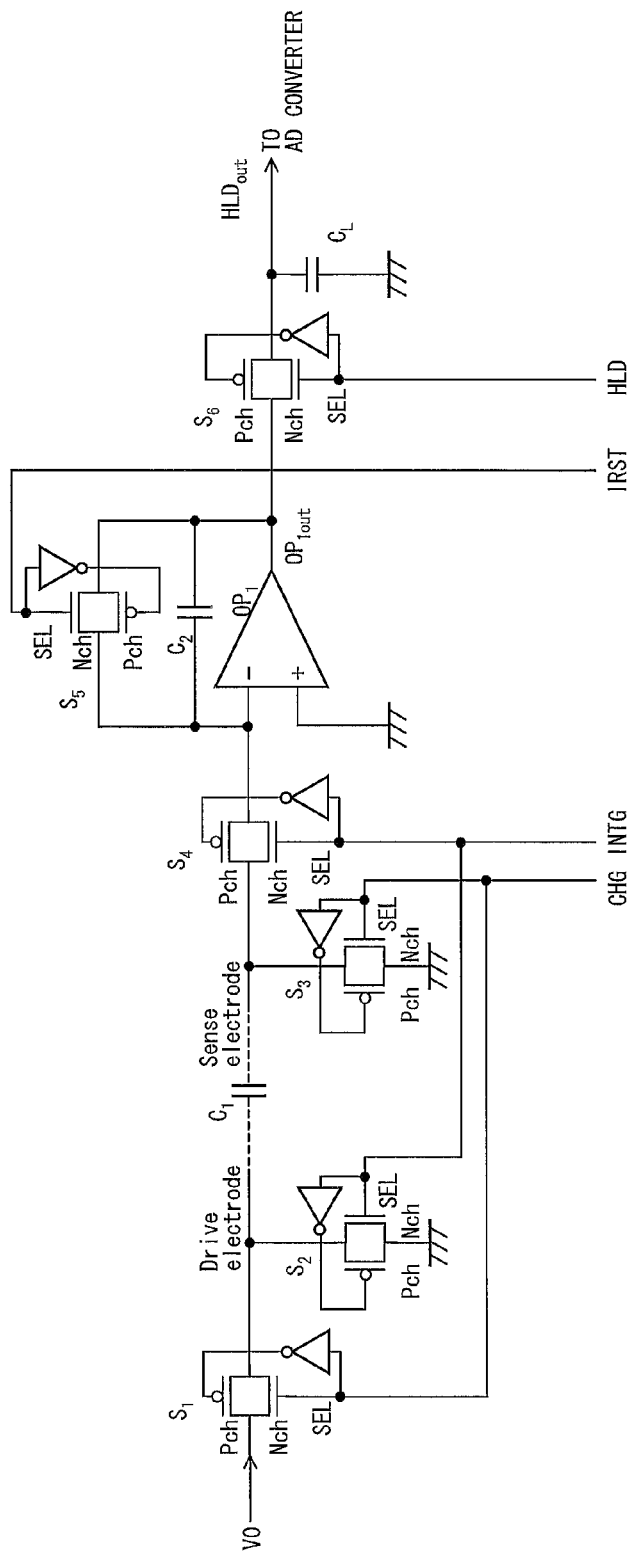
FIG. 5 is an equivalent circuit diagram of a coupling capacitance measuring circuit of the coordinate input device illustrated in FIG. 1.
Figure 6:
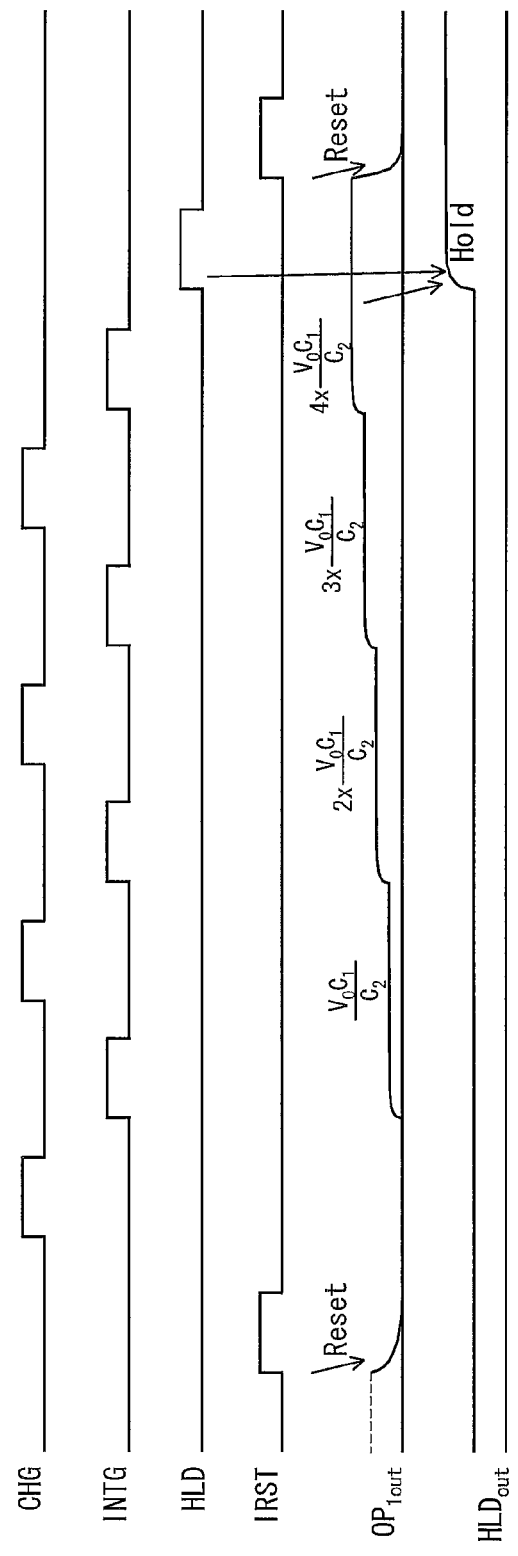
FIG. 6 is a timing diagram illustrating a drive process carried out by the coupling capacitance measuring circuit.

Next, the following description will discuss, with reference to FIGS. 5 and 6, a configuration of the coupling capacitance measuring circuit and its drive timing. Note that the configuration of the coupling capacitance measuring circuit of the first detecting section 15 is identical to that of the second detecting section 16.

FIG. 5 is a block diagram schematically illustrating a configuration of the coupling capacitance measuring circuit.

The coupling capacitance measuring circuit includes six analog switches S1 through S6, and supplies, to the ADC (analog-digital converter) in a subsequent stage, an input potential V0 as HL_Dout (see FIG. 5).

In general, each of the analog switches S1, S2, S3, S4, S5, and S6 is constituted by a Pch transistor, an Nch transistor, and an inverter. According to Embodiment 1, the analog switches S1 and S2 indicate shift registers, that is, the analog switches on the drive electrode side (see FIG. 5). C1 indicates the coupling capacitance between the drive electrode and the receiving electrode. The circuit subsequent to the analog switches S3 and S4 indicates the coupling capacitance measuring circuit.

FIG. 6 is a timing diagram illustrating a driving process carried out by the coupling capacitance measuring circuit.

First, an charge of C2 in a feedback section of an OP amplifier is discharged in response to an IRST signal so that the charge of C2 becomes zero (potentials at both ends of C2 are also 0 (zero) V). This causes the coupling capacitance measuring circuit to be initialized.

In a case where a signal supplied via a CHG terminal (Discharge_B in FIG. 4) is '1', the analog switches S1 and S3 are turned on. While the analog switches S1 and S3 are turned on, a signal supplied via an INTG terminal is equal to '0 (zero)'. Accordingly, the voltage V0 is applied to the drive electrode. This causes a charging current to flow to the coupling capacitance C1, so that an electric charge of C1×V0 is charged in C1.

In a case where (i) the signal supplied via the CHG terminal is '0 (zero)' and (ii) the signal of '1' is applied to the INTG terminal, the analog switches S1 and 3 are turned off, the analog switches S2 and S4 are turned on, and the electric charge of C1×V0 is discharged from C1 toward an input terminal of the OP amplifier. This current is charged in C2 as it is by operation of the OP amplifier, and, accordingly, a voltage of V0×C1/C2 appears on the OP amplifier output side of C2.

Similarly, every time a waveform of one pulse is added to each of the CHG terminal and the INTG terminal, an electric charge is integrated in C2. After the addition of waveforms of four pulses is completed, the voltage on the OP amplifier output side of C2 is 4V0×C1/C2.

Since the coupling capacitance C1 is desired to be measured, this voltage is detected as a voltage proportional to the coupling capacitance.

An output of the OP amplifier is connected to C3 via the analog switch S6. In a case where a signal supplied via a control terminal HLD of the analog switch S6 is '1', the output of the OP amplifier is charged in C3. In a case where the signal supplied via the HLD is '0 (zero)', the output of the OP amplifier is disconnected from the OP amplifier and then a detection voltage is held. This voltage is transmitted to the ADC (analog-digital converter).

<M-Sequence Generator, M-Sequence Reconstructing Circuit>

Figure 7:
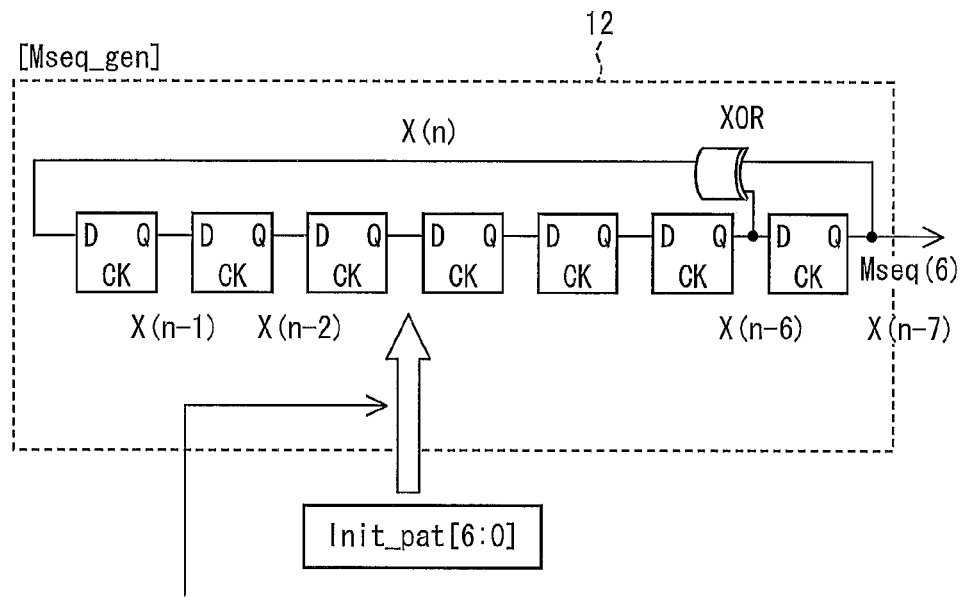
FIG. 7 is an equivalent circuit diagram of an M-sequence generator of the coordinated input device illustrated in FIG. 1.

Next, the following description will discuss, with reference to FIGS. 7 and 8, a configuration of the M-sequence generator 12.

FIG. 7 is a view illustrating an example of the configuration of the M-sequence generator 12 in a case where a cycle of an M-sequence is K=127.

The M-sequence generator 12 is a circuit which satisfies X(n)=X(n−7) xor X(n−6).

Here, in a case where set_pat='1', init_pat[6:0] is set as an initial value of the flip-flops. The above calculation is then carried out at each clock. An output is supplied to the drive electrode driving circuit 13 via an Mseq (6) terminal as the M-sequence signal. Note here that, according to an example illustrated in FIG. 7, '1111111' is used as init_pat[6:0].

The M-sequence signal generated from the M-sequence generator 12 is supplied to the drive electrode driving circuit 13. A digital signal supplied from the receiving electrode selecting circuit 14 needs to be reconstructed into an M-sequence signal in synchronization with the drive electrode driving circuit 13.

In this case, M-sequence reconstruction is carried out as below.

First, assuming that an original M-sequence signal is
{1, 1, 1, 1, 1, 1, 1, 0, 0, 0, 0, 0, 0, 1, 0, 0, 0, 0, 0, . . . 0, 0, 1, 0, 1, 0, 1, 0},
a vector of
MS={1, 1, 1, 1, 1, 1, 1, −1, −1, −1, −1, −1, −1, 1, −1, −1, −1, −1, −1, . . . −1, −1, 1, −1, 1, −1, 1, −1}
is generated by replacing 1 and 0 with 1 and −1, respectively. Then, 127 vectors are generated by sequentially rotating components of the vector leftward, so that an inverse matrix DM as illustrated in FIG. 8 is prepared. According to FIG. 8, the inverse matrix DM is a symmetric matrix.

Assuming that the 127 ADC vectors are
ADC={a1, a2, a3, a4, . . . , a126, a127}, a reconstructing signal Rcon is represented by the following equation (1). Note that, in the equation (1), '.' denotes an inner product of the inverse matrix DM and a longitudinal vector ADC.

[Math. 1]

$$Rcon = DM \cdot ADC \qquad (1)$$

That is, according to the M-sequence reconstructing, a 127×127 matrix is prepared, and the reconstructing data Rcon represented by equation (1) is then found assuming that AD-converted 127 data columns are ADC.

The M-sequence reconstructing is carried out by the M-sequence reconstructing circuit 18 (described earlier).

Figure 9:
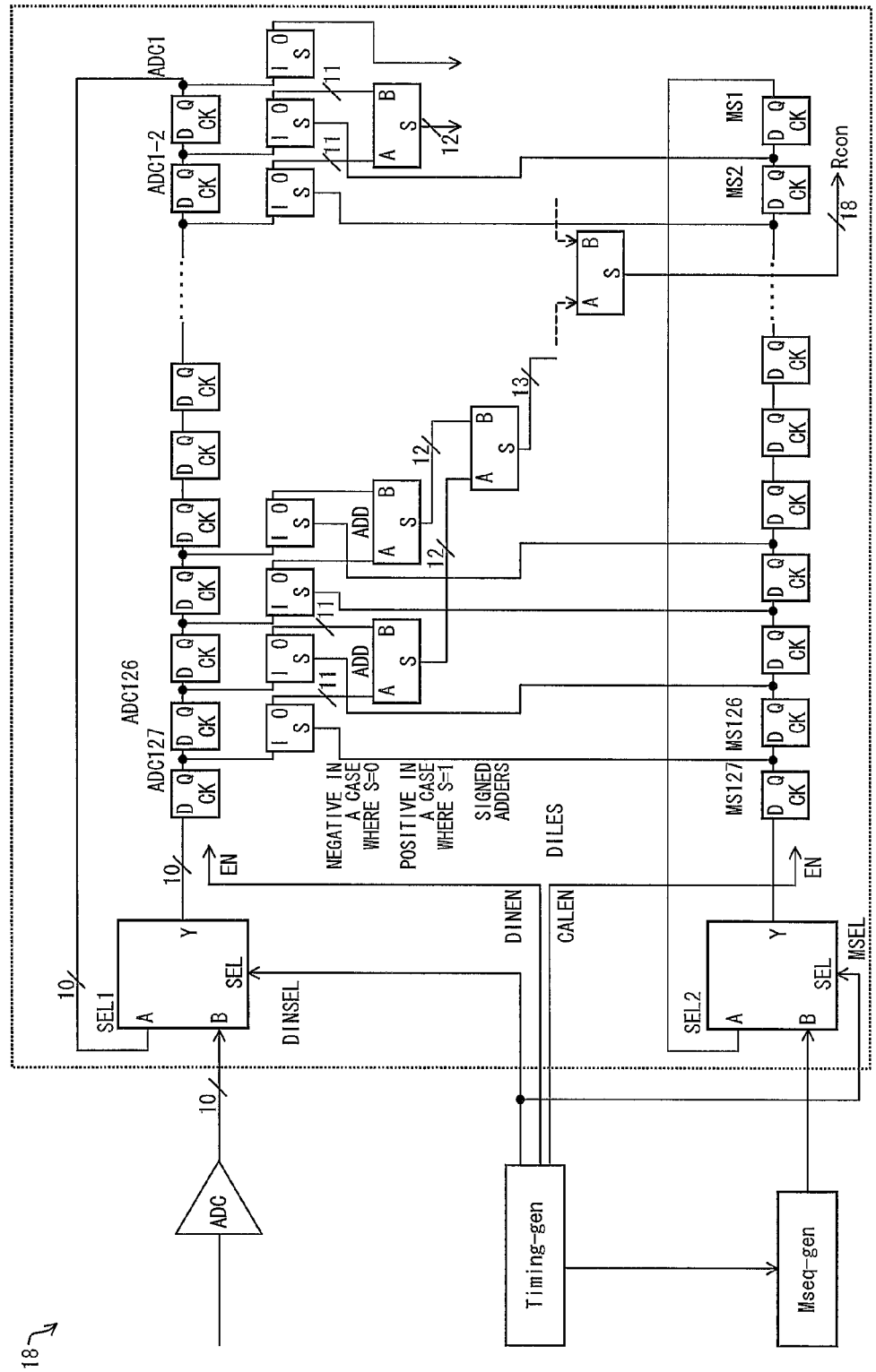
FIG. 9 is an equivalent circuit diagram of an M-sequence reconstructing circuit of the coordinate input device illustrated in FIG. 1.
Figure 10:
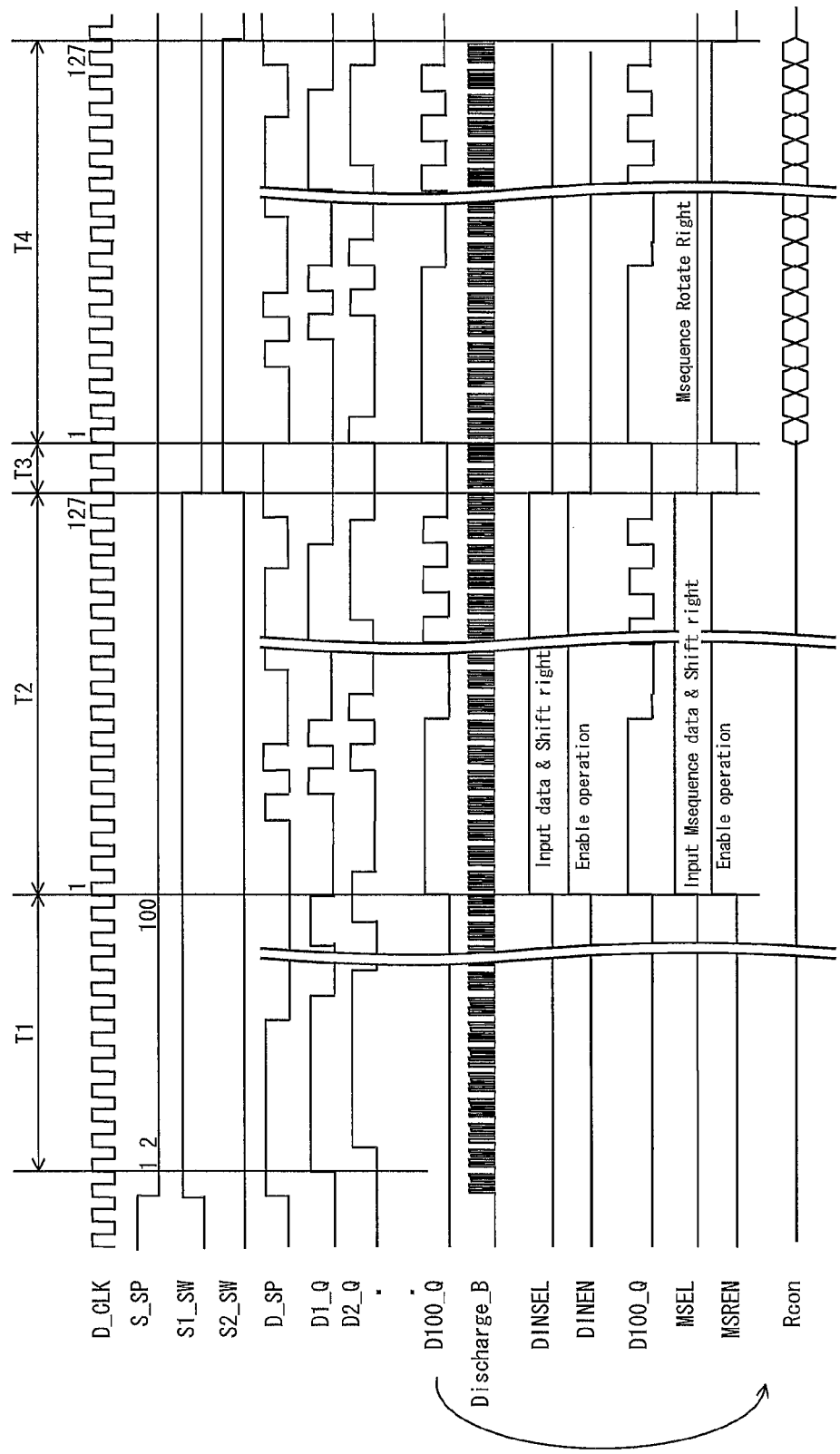
FIG. 10 is a timing diagram illustrating an operation timing of the M-sequence reconstructing circuit illustrated in FIG. 9.

The following description will discuss, with reference to FIGS. 9 and 10, a configuration and an operation of the M-sequence reconstructing circuit 18.

FIG. 9 is a block diagram schematically illustrating the configuration of the M-sequence reconstructing circuit 18.

According to the M-sequence reconstructing circuit 18, the foregoing equation (1) is satisfied by the shift register.

That is, an AD-converted 10-bit output is connected to a B terminal of SEL1 , and an output of the SEL1 is supplied via a D terminal of a 10-bit flip-flop ADC 127 (see FIG. 9). 10-bit flip-flops ADC127 to ADC 1, which constitute 127 shift registers, control operation enable in response to a signal supplied via a DINEN terminal. A Q terminal of the ADC 1 in the final stage is connected to an A terminal of SEL1 .

Q terminals of the ADC 127 to ADC 1 are connected to respective 127 two's complement generators, each of which generates a two's complement.

In a case where an input of a signal, which is '0 (zero)', is supplied via a control terminal S of each of the two's complement generators, a two's complement of the input is calculated so that the input is converted into 11-bit signed data in which a most significant bit is negative '1'. The 11-bit signed data is supplied to a corresponding adder in a subsequent stage.

Meanwhile, in a case where the input of the signal, which is '1', is supplied via the control terminal S, the input is converted into 11-bit signed data in which the most significant bit is positive '0 (zero)'.

Such control terminals S are connected to respective Q terminals of the 127 flip-flops in which the M-sequence is stored.

The M-sequence pattern supplied from the M-sequence generator 12 is connected to a B terminal of SEL2 . MS127 to MS1 are 127 flip-flops each of which is a 1-bit flip-flop and which control operation enable by a signal supplied via a CALEN terminal. The Q terminal of the ADC 1 in the final stage is connected to the A terminal of the SEL1 . An output terminal of the MS1 is connected to an A terminal of the SEL2 . MSEL selects an output from the Mseq-gen or a loop output from the MS1 , and then supplies the selected output to the Q terminal of the MS127.

Each of the adders adds two pieces of signed data. The adder in the final stage finally outputs 18-bit Rcon as a total output of all pieces of signed data.

The 18-bit Rcon is outputted, by pipeline processing, as a calculation result of matrix calculation based on the equation (1), that is, as a signal obtained by M-sequence demodulation.

The following will discuss, with reference to a timing diagram illustrated in FIG. 10, an operation of the M-sequence reconstructing circuit 18 having the configuration.

T1 is a preparatory time period during which data are set in the flip-flops of the drive electrode driving circuit 13. After generation of the M-sequence and clocks for N drive electrodes, a pattern at the head of the M-sequence is set to the lowest drive electrode Dn.

T2 is a time period which corresponds to a cycle of the M-sequence and which has K clocks (127 clocks in an example of FIG. 10). According to the Nth drive electrode, a pattern of the M-sequence for one cycle is changed by K clocks. During the time period T2, the coupling capacitance is detected for each clock and then AD-converted. AD-converted data thus obtained is supplied via the B terminal of the SEL1 . In a case where DINSEL='1' and DINEN='1', the AD-converted data is shifted through the flip-flips for each clock. After K clocks, 127 pieces of data is stored in the ADC shift register.

In a case where DINEN='0 (zero)', the shift of the AD-converted data is stopped. In this case, MSEL is '1' and MSREN is '1'. Therefore, as in the case of the AD-converted data, a generated M-sequence pattern is stored in 127 shift registers having one bit in width. An output of each of the 127 flip-flops is connected to a corresponding two's complement generator. $ADC_N$ corresponding to '1' is handled as a positive number, and $ADC_N$ corresponding to '0 (zero)' is handled as a negative number by obtaining a two's complement, so that a total sum of these numbers is obtained and then supplied to Rcon.

At the first clock, a coupling capacitance $C_X$ is reconstructed as Rcon. At the next clock, a coupling capacitance $C_{X-1}$ is reconstructed as Rcon. That is, the coupling capacitances $C_1, C_0, C_{-1} \ldots$ , and $C_{X-M+1}$ are each reconstructed as Rcon. These X $C_X$, $C_{X-1}$, ..., and $C_1$ are capacitances corresponding to respective X drive electrodes.

Since the operation of the M-sequence reconstructing circuit 18 is carried out by pipeline processing, the M-sequence reconstruction is started during T4 in which the second receiving electrode is selected (S2_SW='1').

<Effects of Invention>

The M-sequence driving generally makes it possible to increase the SN of the detection signal by (K+1)/2/Sqrt(K) (K is a cycle of the M-sequence) (see the descriptions in Patent Literatures 1 and 2).

Furthermore, according to Embodiment 1, the blocks on the receiving electrode side are parallelized. This increases a processing speed by N times.

Performance of a touch panel has a trade-off relationship between the detection speed and a coordinate detection accuracy which is inversely proportional to the S/N of the detection signal.

For example, according to the conventional scanning, in a case where (i) SN=1 at a scan time T=1 and (ii) coordinates detected by two scans are averaged out, the detection accuracy is 1/Sqrt(2). In a case where coordinates detected by four scans are averaged out, the detection accuracy is 1/Sqrt(4). This reveals that the detection time is longer as the detection accuracy is to be improved (see a dotted line of a graph shown in FIG. 11).

Figure 11:
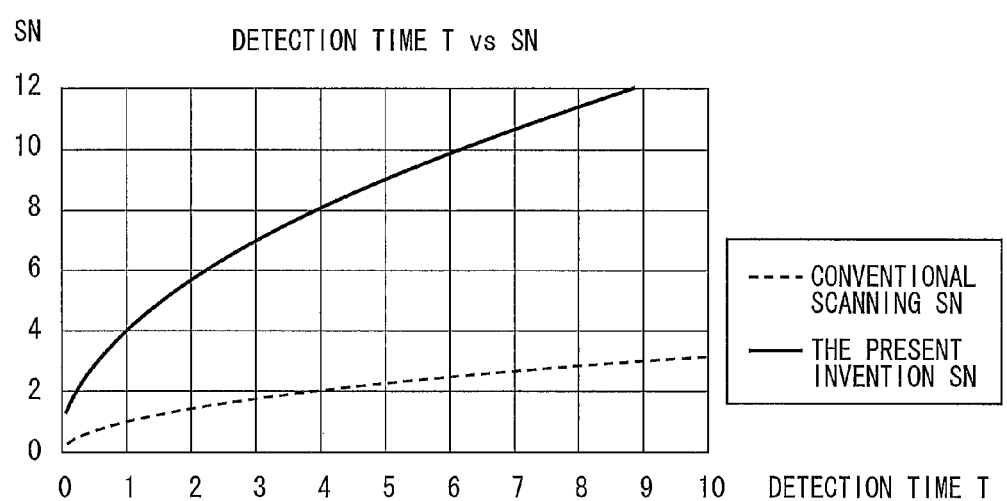
FIG. 11 is a graph illustrating a relationship between a detection time and an SN of each of the present invention and a conventional technique.

However, according to the scanning carried out by the M-sequence driving which is employed in the coordinate input device of Embodiment 1, even if the scanning time (the drive electrodes+K) is a little, i.e., two times, longer than that of the conventional scanning, it is possible to achieve, in an identical detection time, the detection accuracy four times greater than that achieved by the conventional scanning (see a solid line of a graph shown in FIG. 11).

That is, (K+1)/2/Sqrt(K)/Sqrt(2)=4.02 where K=127.

Furthermore, in a case where parallelization is carried out under N=8, it is possible to effectively improve the SN by (K+1)/2/Sqrt(K)/Sqrt(2)×Sqrt(8)=11.4 (K=127) times.

[Embodiment 2]

The following description will discuss a second embodiment of the present invention. Note that Embodiment 2 will discuss a parallel M-sequence reconstructing circuit which carries out, in parallel, a process carried out by the M-sequence reconstructing circuit 18 of the configuration of the coordinate input device of Embodiment 1.

Figure 12:
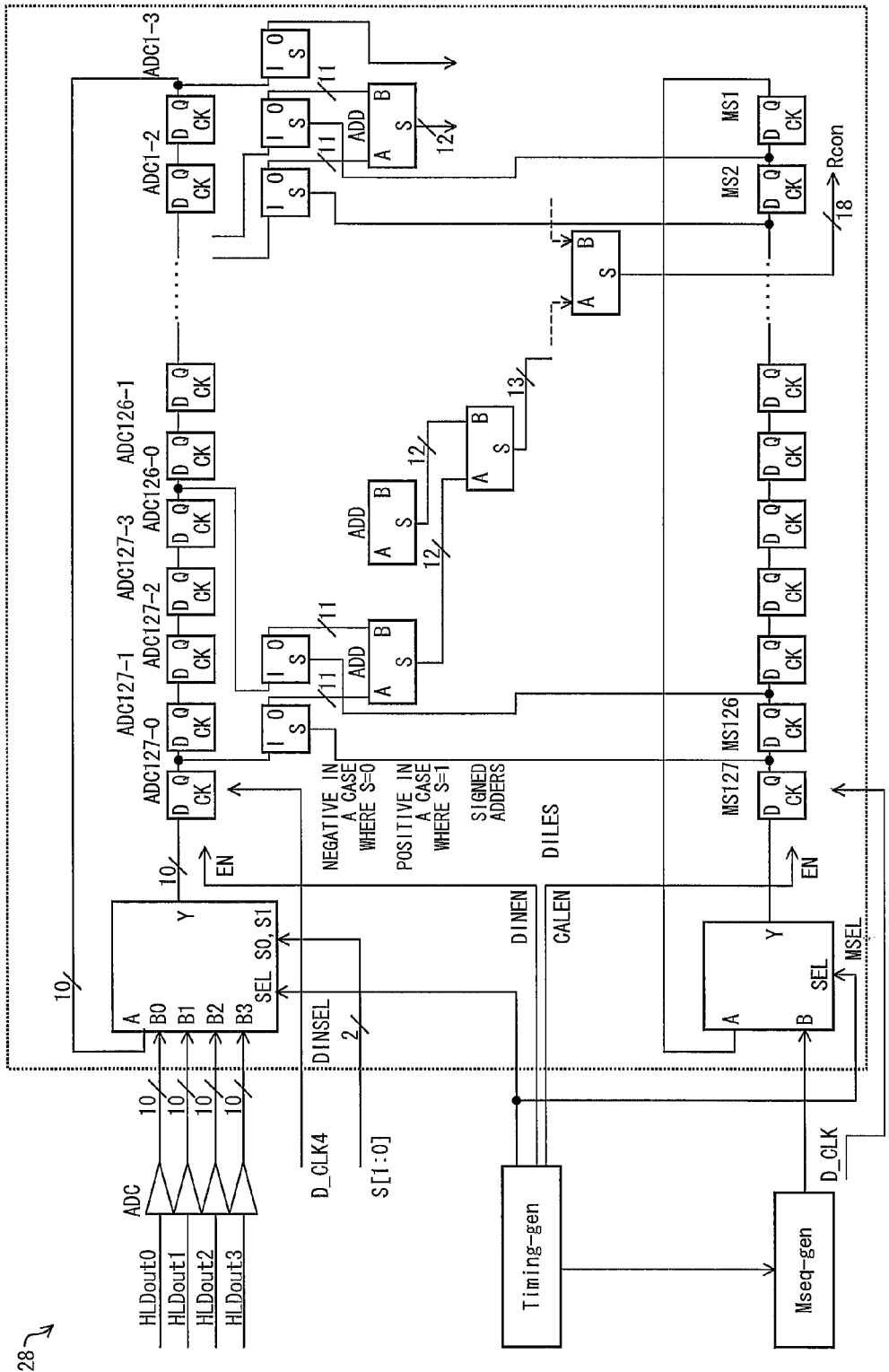
FIG. 12 is a block diagram schematically illustrating a configuration of an M-sequence reconstructing circuit which carries out an M-sequence reconstructing process in parallel.

FIG. 12 is a block diagram schematically illustrating a configuration of an M-sequence reconstructing circuit 28 which carries out an M-sequence reconstructing process in parallel. Note here that Embodiment 2 will discuss a case where concurrency is 4. The concurrency means that a plurality of coupling capacitances are measured in parallel by dividing, into a plurality of (two or more) blocks, the receiving electrode group connected to the receiving electrode selecting circuit 14 described in Embodiment 1.

That is, according to the M-sequence reconstructing circuit 28, HL_Dout0 through HL_Dout3 are ADC outputs from four parallel receiving circuits (see FIG. 12). The ADC outputs are connected to input terminals of an SEL3, and any of output terminals of the SEL3 are selected by S[1:0] so that the ADC outputs are supplied to a Y terminal of the SEL3. In a case where a signal supplied via an SEL terminal is '0 (zero)', ADC1 through 3 are selected. In a case where the signal supplied via the SEL terminal is '1', B0 through B3 are selected.

In a case where the plurality of coupling capacitances are measured in parallel, a data shift register includes an increased number of flip-flops in accordance with multiplicity (4 in this example). That is, the M-sequence reconstructing circuit 28 of Embodiment 2 is made up of 127×4 stages of flip-flops, as compared with the foregoing M-sequence demodulating circuit 28 made up of the single-stage flip-flops.

Further, a clock D_CLK4 to be used is a clock which is four times higher in frequency than D_CLK.

S[1:0] is arranged such that four phases are provided during one cycle of D_CLK so that all of HL_Dout0 through HL_Dout3 are selected during one cycle of D_CLK. An adder is extracted for every four flip-flops of the data shift register (for example, ADC126-0 follows ADC127-0).

Note that D_CLK is used as a clock for an M-sequence register. The M-sequence register operates by a driving method identical to that of the foregoing M-sequence demodulating circuit 28 which is made up of the single-stage flip-flops.

Figure 13:
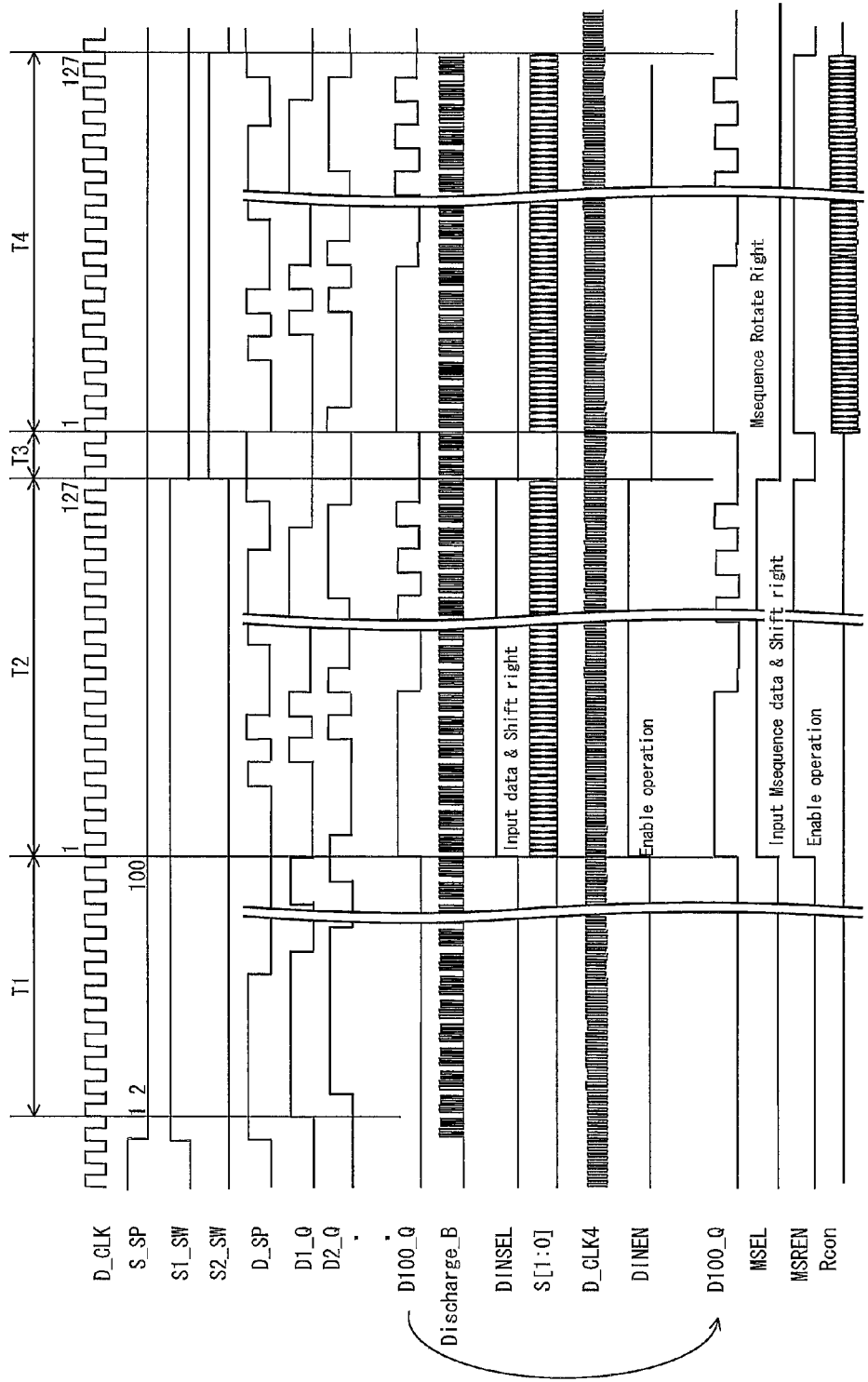
FIG. 13 is a timing diagram illustrating an operation timing of the M-sequence reconstructing circuit illustrated in FIG. 12.

The following description will discuss, with reference to a timing diagram illustrated in FIG. 13, how the M-sequence reconstructing circuit 28 having the configuration operates.

Note here that D_CLK4 is a clock which is four times higher in frequency than D_CLK.

Note also that S[1:0] is a signal which is generated from D_CLK4 and which changes from '00', at the head of a decoding start period T2, to '01', '10', '11', '00', ...

First, data of the blocks specified by S[1:0] are sequentially captured into the ADC shift register. The ADC shift register includes the 127×4 stages of the flip-flops, and an adder tap is extracted from a Q output for every four stages of the flip-flops.

Therefore, a signed result obtained by addition of ADC127-0, ADC126-0, ..., ADC1-0 is calculated as Rcon. Since an output of a corresponding one of the blocks of the receiving electrode group, which one differs at each rise of D_CLK4, is supplied from an ADC, Rcon always has a result of addition with respect to an identical one of the blocks of the receiving electrode group. Rcon is outputted so that the blocks change cyclically at each rise of D_CLK4.

Therefore, the M-sequence reconstructing circuit 28 having the configuration makes it possible to obtain, as Rcon, a calculation result at a speed four times higher than that in the case of the M-sequence demodulating circuit 28 which is made up of the single-stage flip-flops.

Figure 14:
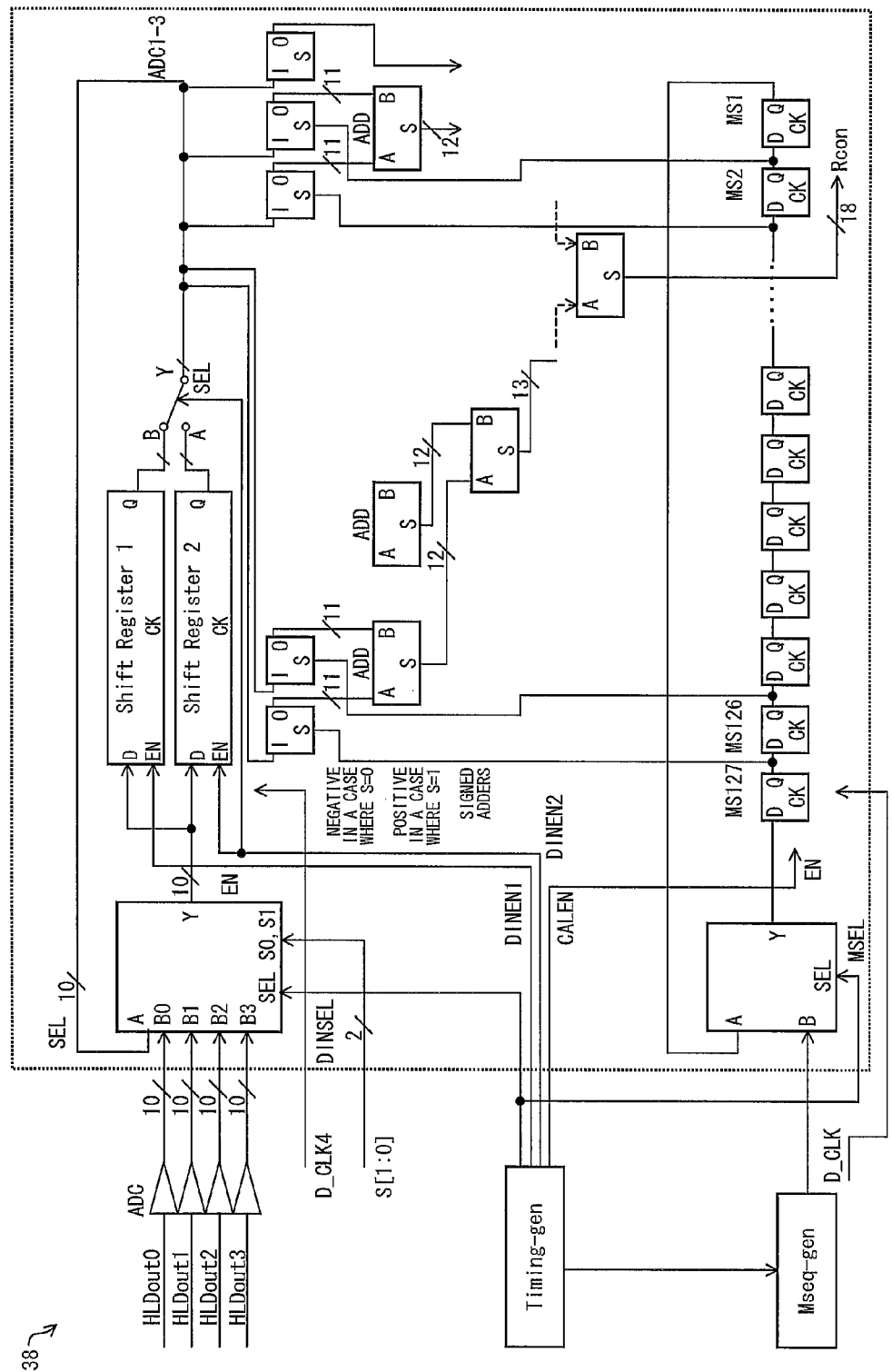
FIG. 14 is an equivalent circuit diagram of another M-sequence reconstructing circuit which carries out an M-sequence reconstructing process in parallel.

FIG. 14 is a block diagram schematically illustrating a configuration of another M-sequence reconstructing circuit 38 which carries out an M-sequence reconstructing process in parallel.

Figure 15:
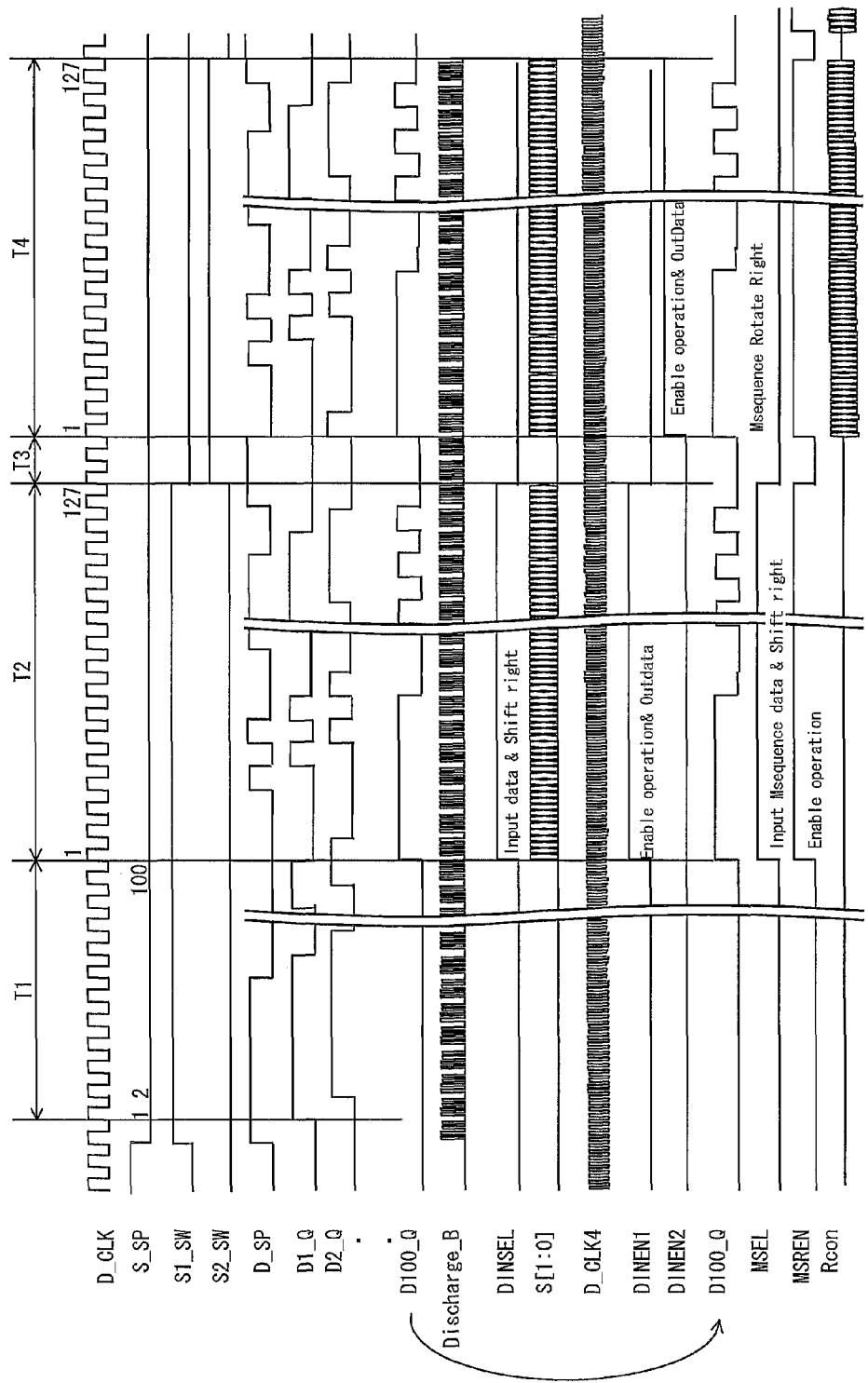
FIG. 15 is a timing diagram illustrating a timing of each signal in a case where the M-sequence reconstructing process is carried out by the another M-sequence reconstructing circuit illustrated in FIG. 14.

FIG. 15 is a timing diagram illustrating a timing of each signal in a case where the M-sequence reconstructing process is carried out by the M-sequence reconstructing circuit 38 illustrated in FIG. 14. According to the timing diagram, DINEN1 is '1' in a case where an odd-numbered one of the receiving electrodes is selected, and DINEN2 is '1' in a case where an even-numbered one of the receiving electrodes is selected.

According to the drive timing diagram of the M-sequence reconstructing circuit 28 (FIG. 13), a time of (N+K+K)× D_CLK is required until the first receiving electrode S1 is selected, the drive electrodes are scanned, and then an M-sequence reconstructing signal is obtained. In a case where the receiving electrode S2 is selected, the M-sequence reconstructing process with respect to the receiving electrodes S2 is completed in a time of (K+K)×D_CLK because an M-sequence has already been set to a drive electrode driving circuit 13. That is, a time of (N+2K×Mb)×D_CLK is required to scan all of the receiving electrodes. Note here that MB denotes the number of the receiving electrodes of one of the blocks.

In contrast, according to the M-sequence reconstructing circuit 38 illustrated in FIG. 14, two shift registers are provided in the M-sequence reconstructing circuit 38. This enables data of a subsequent one of the receiving electrodes to be captured into one of the shift registers during a cycle in which the other of the shift registers is carrying out the M-sequence reconstructing process.

That is, in a case where the receiving electrode S1 is selected, DINSEL1 is '1' and DINSEL2 is '0 (zero)'. Therefore, data from the ADC is captured into and shifted through the shift register 1. Meanwhile, the shift register 2 maintains a previous value.

In a case where the receiving electrode S2 is selected, DINSEL1 is '0 (zero)' and DINSEL2 is '1'. Therefore, data from the ADC is captured into and shifted through the shift register 2. Meanwhile, the shift register 2 maintains a previous value. The previous value is supplied via SEL3 to adders, where summation is carried out. A result of the summation is then outputted as Rcon. In a case where the receiving electrode S3 is selected, operation is carried out which is identical to that carried out in the cycle of the receiving electrode S1.

As described above, it is possible to continuously carry out M-sequence demodulating calculation by employing the two shift registers and switching between the two shift registers for each of the receiving electrodes.

With this configuration, it is possible to reduce, to (N+K× Mb)×D_CLK, a time in which all of the receiving electrodes are scanned and then demodulation is completed.

As has been described in Embodiment 1, in a case where data is shifted by the shift register and the adders are used while being fixed, a huge number of wires are necessary for switches between the adders and the shift register, which is time-shared. This makes it more difficult to design a layout of the M-sequence reconstructing circuit as N is increased.

In contrast, according to Embodiment 2, it is possible to easily design the layout of the M-sequence reconstructing circuit even in a case of large N time-sharing.

[Embodiment 3]

The following description will discuss a third embodiment of the present invention.

<Description of Overall Configuration of Coordinate Input Device>

Figure 16:
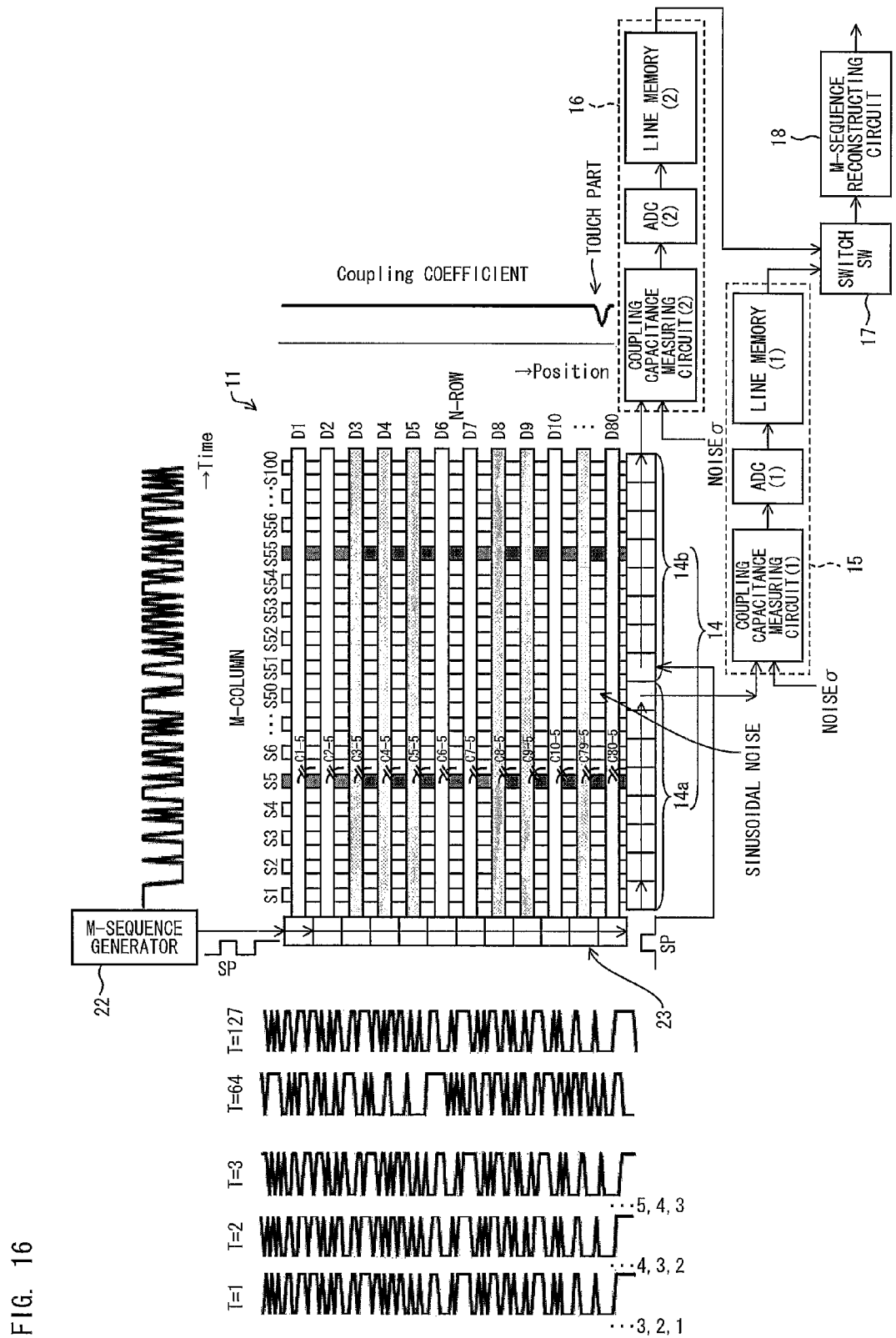
FIG. 16 is a block diagram schematically illustrating a configuration of a coordinate input device in accordance with an embodiment.

FIG. 16 is a block diagram schematically illustrating a configuration of a coordinate input device in accordance with Embodiment 3.

Note here that the coordinate input device of Embodiment 3 includes: an M-sequence generator 22; a drive electrode driving circuit 23; and an M-sequence reconstructing circuit 48, which are different in configuration from the M-sequence generator, the drive electrode driving circuit, and the M-sequence reconstructing circuit, respectively, of the coordinate input device of Embodiment 1. Since a configuration of the coordinate input device in accordance with Embodiment 3, except for the drive electrode driving circuit 23 and the M-sequence reconstructing circuit 48, is identical to that of the coordinate input device illustrated in FIG. 1, a detailed description thereof is omitted here.

Figure 17:
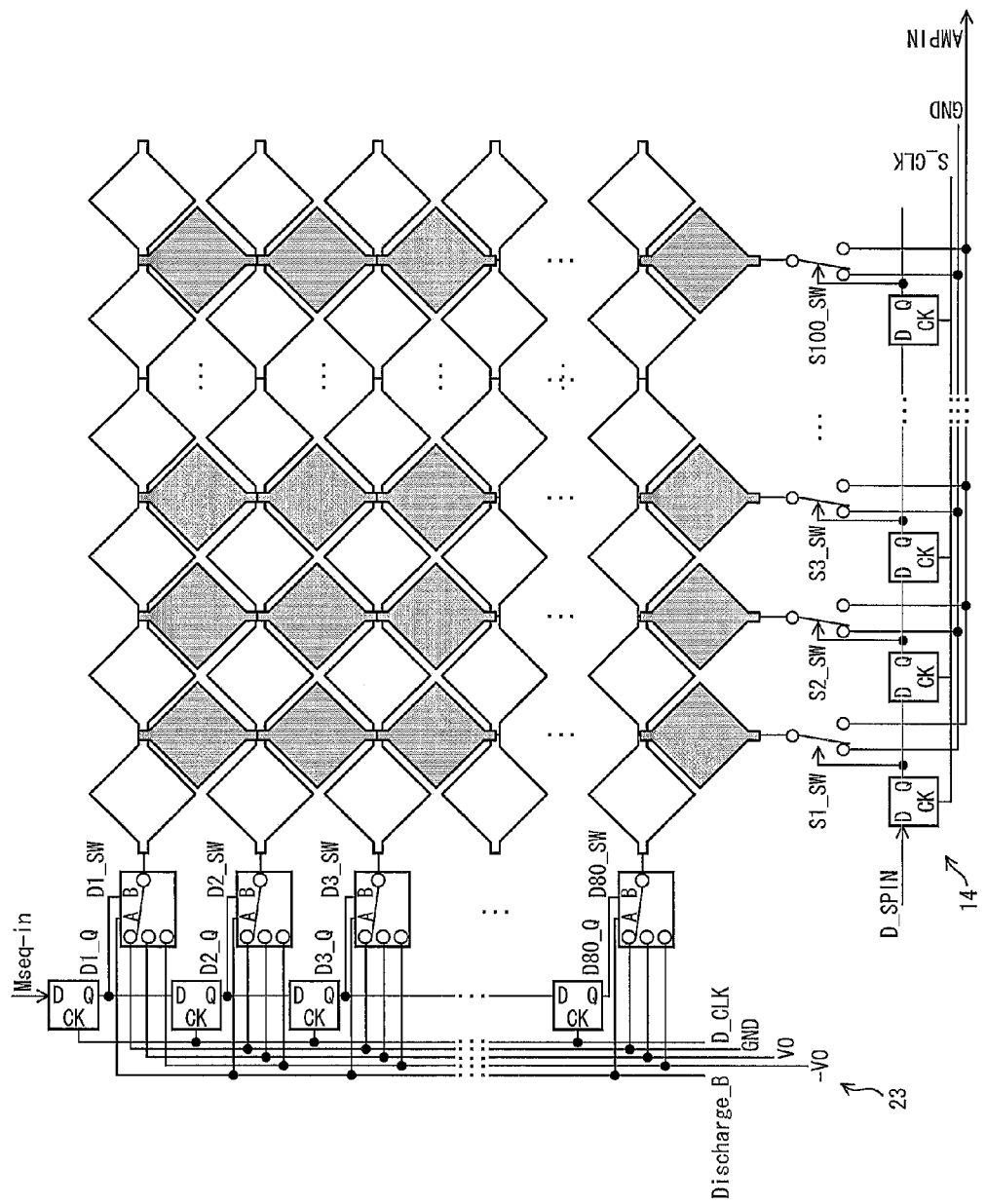
FIG. 17 is a view schematically illustrating an electrode structure and configurations of driving circuits, of the coordinate input device.

FIG. 17 is a view schematically illustrating an electrode structure and configurations of driving circuits, of the coordinate input device. Note here that, for convenience of explanation, FIG. 17 illustrates the coordinate input device in which the receiving electrode group is not divided into blocks.

The drive electrode driving circuit 23 includes flip-flops which are connected in series, and controls, in response to an output Q of a corresponding one of the flip-flops and a signal Discharge_B, an analog switch connected to each of drive electrodes (see FIG. 17).

In a case where the output Q='1' and Discharge_B='1', a voltage V0 is applied to a drive electrode.

In a case where the output Q='0 (zero)' and Discharge_B='1', the voltage −V0 is applied to the drive electrode.

In the other cases, the drive electrode is connected to a GND.

To the flip-flop D in the first stage, an output of the M-sequence generator, i.e., an M-sequence signal is inputted. A pattern of the M-sequence signal is shifted downward step by step at each rise of D_CLK.

Since a receiving electrode selecting circuit 14 of Embodiment 3 has a configuration identical to that of the receiving electrode selecting circuit 14 illustrated in FIG. 2 of Embodiment 1, a detailed description thereof is omitted here.

As described above, in a case where the voltage −V0 or +V0 is applied to the drive electrode, or the drive electrode is connected to the GND, a signal obtained from a mutual capacitance between all of the drive electrodes and a selected receiving electrode is supplied to a coupling capacitance measuring circuit.

According to the coordinate input device illustrated in FIG. 16, the drive electrodes to which the voltage V0 is applied in a case where Discharge_B='1' are connected to the receiving electrode S5 via C3-5, C4-5, C5-5, C8-5, C9-5, and C79-5, respectively. The drive electrodes to which the voltage −V0 is applied in a case where Discharge_B='1' are connected to the receiving electrode S5 via C1-5, C2-5, C6-5, C7-5, C10-5, and C80-5, respectively.

The coordinate input device having the configuration is different from the coordinate input device of Embodiment 1 in coupling between (i) the drive electrode inputted into the coupling capacitance measuring circuit and (ii) the receiving electrode. Therefore, the coupling capacitance measuring circuit of Embodiment 3 has a different configuration.

The following description will discuss the configuration and an operation of the coupling capacitance measuring circuit of the coordinate input device in accordance with Embodiment 3.

[Coupling Capacitance Measuring Circuit]

Figure 18:
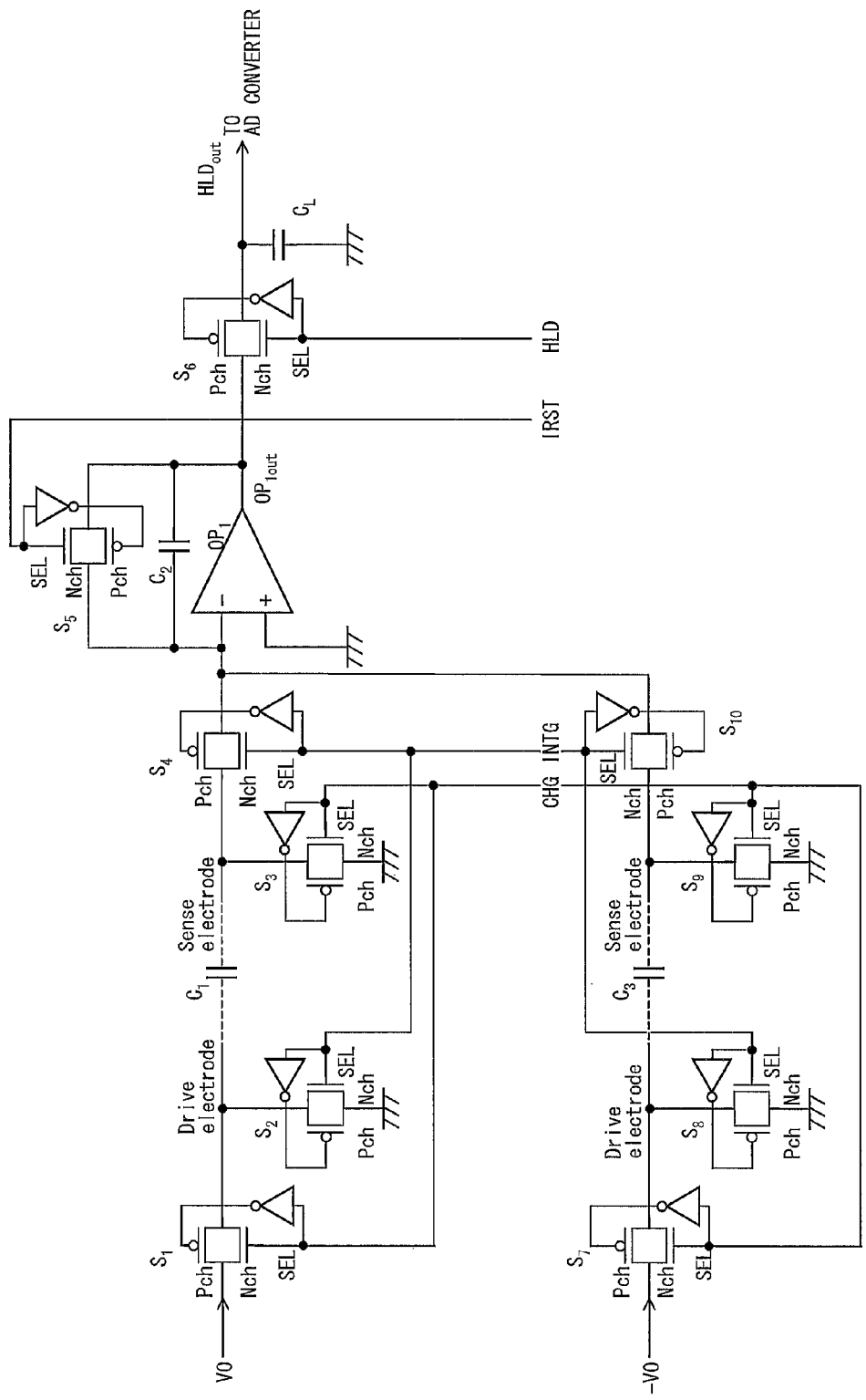
FIG. 18 is an equivalent circuit diagram of a coupling capacitance measuring circuit of the coordinate input device illustrated in FIG. 16.

FIG. 18 is an equivalent circuit diagram of a coupling capacitance measuring circuit of the coordinate input device illustrated in FIG. 16, assuming that C3-5+C4-5+C5-5+C8-5+C9-5+...+C79-5=C1 and C1-5+C2-5+C6-5+C7-5+C10-5+...+C80-5=C3.

That is, in a case where the coupling capacitance measuring circuit illustrated in FIG. 18 is used, a result obtained by integration by four pulses and then held is represented by 4×V0×(C1−C3)/C2. It follows that the coupling capacitance measuring circuit has a voltage lower, by a presence of −C3, than that of the coupling capacitance measuring circuit of Embodiment 1 which coupling capacitance measuring circuit is not driven at −V0.

Therefore, even an amplifier having smaller C2 makes it possible to obtain a broad dynamic range.

Further, according to a capacitive touch panel having a large area, C1 and C3 are large. This causes an increase in size of an LSI corresponding to each of C1 and C3, depending on C2. In view of the circumstances, in a case where the feedback capacitance C2 of an integrator can be decreased (see the example shown in FIG. 18), it is consequently possible to decrease a chip area of the LSI and to design a circuit at low cost.

Figure 19:
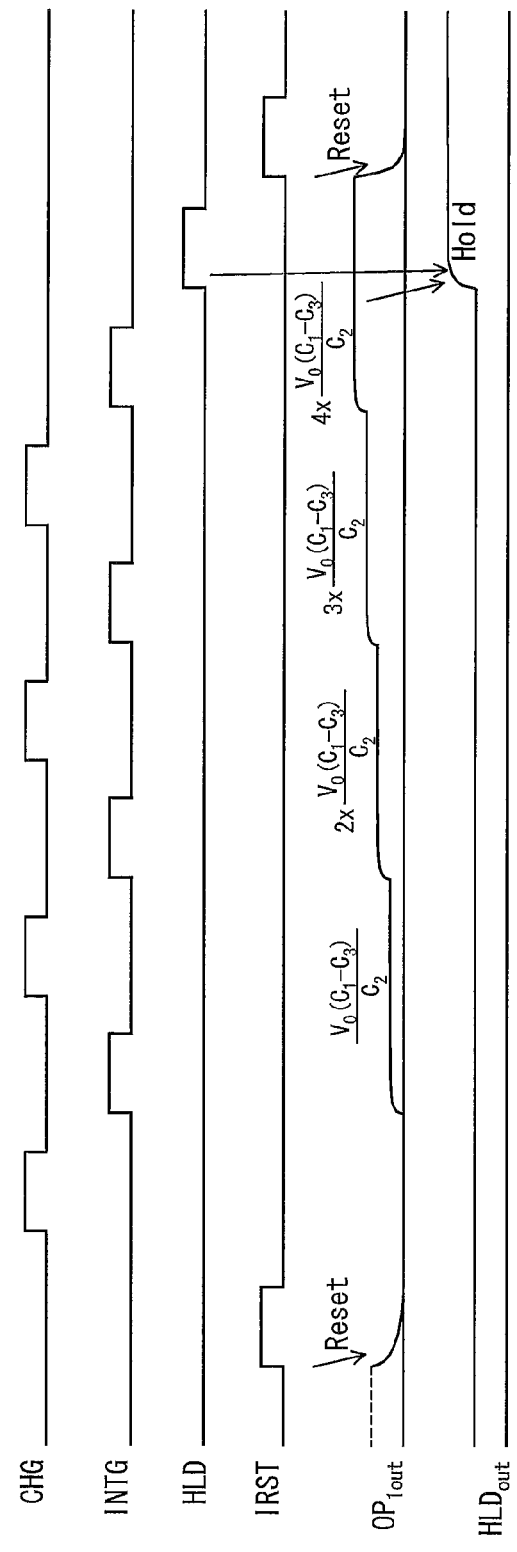
FIG. 19 is a timing diagram illustrating a driving process carried out by the coupling capacitance measuring circuit illustrated in FIG. 18.

FIG. 19 is a timing diagram illustrating a driving process carried out by the coupling capacitance measuring circuit illustrated in FIG. 18.

Note that, as is clear from the timing diagram illustrated in FIG. 19, the coupling capacitance measuring circuit of Embodiment 3 operates at a timing identical to that at which the coupling capacitance measuring circuit operates (illustrated in FIG. 15) of the coordinate input device of Embodiment 1 (see the timing diagram illustrated in FIG. 6).

<M-Sequence Generating Circuit>

Figure 20:
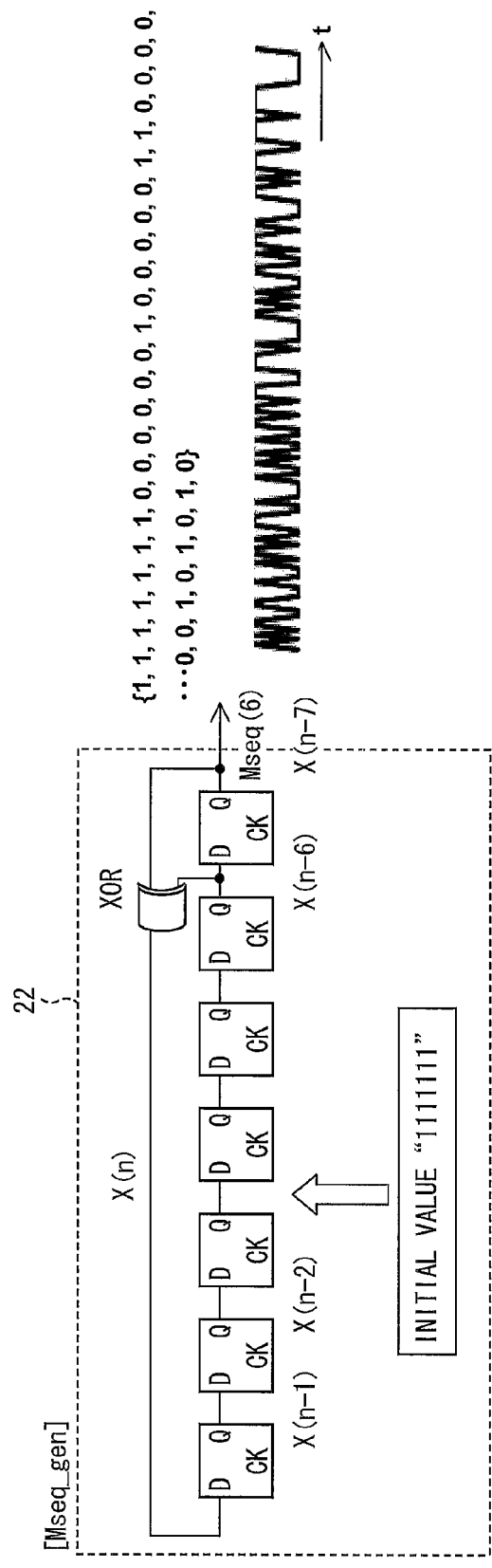
FIG. 20 is an equivalent circuit diagram of an M-sequence generator of the coordinated input device illustrated in FIG. 16.

FIG. 20 is a block diagram schematically illustrating a configuration of the M-sequence generator 22 in accordance with Embodiment 3.

According to the M-sequence generator 22 in accordance with Embodiment 3, a plurality of drive electrodes are simultaneously activated. Therefore, the coupling capacitance, which is measured by a receiving circuit, between (i) the plurality of drive electrodes and (ii) the receiving electrode can be represented by the following equation (2), and an signal {a1, a2, ..., a 127} is applied to an analog-digital converter.

[Math. 2]

$$\begin{bmatrix} a1 \\ a2 \\ a3 \\ a4 \\ \vdots \\ a127 \end{bmatrix} = \begin{bmatrix} 1, & 1, & 1, & 1, & 1, & 1, & 1, & -1, & -1, & -1, & -1, & -1, & -1, & 1, & \cdots & -1, & -1, & 1, & -1, & 1, & -1, & 1, & -1 \\ 1, & 1, & 1, & 1, & 1, & 1, & -1, & -1, & -1, & -1, & -1, & -1, & 1, & -1, & \cdots & -1, & 1, & -1, & 1, & -1, & 1, & -1, & 1 \\ 1, & 1, & 1, & 1, & 1, & -1, & -1, & -1, & -1, & -1, & -1, & 1, & -1, & -1, & \cdots & 1, & -1, & 1, & -1, & 1, & -1, & 1, & 1 \\ 1, & 1, & 1, & 1, & -1, & -1, & -1, & -1, & -1, & -1, & 1, & -1, & -1, & -1, & \cdots & -1, & 1, & -1, & 1, & -1, & 1, & 1, & 1 \\ & & & & & & & \vdots & & & & & & & & & & & & & & & \\ -1, & 1, & 1, & 1, & 1, & 1, & 1, & 1, & -1, & -1, & -1, & -1, & -1, & -1, & \cdots & -1, & -1, & -1, & 1, & -1, & 1, & -1, & 1 \end{bmatrix} \begin{bmatrix} C80 \\ C79 \\ C78 \\ C77 \\ \vdots \\ C1 \\ Cd47 \\ \vdots \\ Cd1 \end{bmatrix}$$

(2)

Assuming here that CV={C80, C79, C78, . . . , C1, Cd47, . . . , Cd1} and a matrix of an M-sequence in the equation (2) is DM, the following equation (3) is obtained.

[Math. 3]

$$ADC^T = DM \cdot CV^T \qquad (3)$$

Assuming that a matrix obtained by replacing a factor $-1$ of DM in the equation (3) with 0 (zero) is IM, the following equation (4) is obtained.

[Math. 4]

$$IM = \begin{bmatrix} 1, & 1, & 1, & 1, & 1, & 1, & 1, & 0, & 0, & 0, & 0, & 0, & 0, & 1, & \cdots & 0, & 0, & 1, & 0, & 1, & 0, & 1, & 0 \\ 1, & 1, & 1, & 1, & 1, & 1, & 0, & 0, & 0, & 0, & 0, & 0, & 1, & 0, & \cdots & 0, & 1, & 0, & 1, & 0, & 1, & 0, & 1 \\ 1, & 1, & 1, & 1, & 1, & 0, & 0, & 0, & 0, & 0, & 0, & 1, & 0, & 0, & \cdots & 1, & 0, & 1, & 0, & 1, & 0, & 1, & 1 \\ 1, & 1, & 1, & 1, & 0, & 0, & 0, & 0, & 0, & 0, & 1, & 0, & 0, & 0, & \cdots & 0, & 1, & 0, & 1, & 0, & 1, & 1, & 1 \\ & & & & & & & \vdots & & & & & & & & & & & & & & & \\ 0, & 1, & 1, & 1, & 1, & 1, & 1, & 1, & 0, & 0, & 0, & 0, & 0, & 0, & \cdots & -1, & 0, & 0, & 1, & 0, & 1, & 0, & 1, \end{bmatrix}$$

(4)

Here, in a case where a product of IM and DM is obtained, the following equation (5) is obtained. Note, however, that the equation (5) is obtained in a case where an order of the M-sequence is K=127=$2^7$−1, and a coefficient on the right-hand side of the equation (5) is (K+1)/2 according to a general expression.

[Math. 5]

$$IM \cdot DM = 2^6 \times \begin{bmatrix} 1, & 0, & 0, & 0, & 0, & 0, & 0, & 0, & 0, & 0, & 0, & 0, & 0, & 0, & 0, & \cdots & 0, & 0, & 0, & 0, & 0, & 0, & 0, & 0 \\ 0, & 1, & 0, & 0, & 0, & 0, & 0, & 0, & 0, & 0, & 0, & 0, & 0, & 0, & 0, & \cdots & 0, & 0, & 0, & 0, & 0, & 0, & 0, & 0 \\ 0, & 0, & 1, & 0, & 0, & 0, & 0, & 0, & 0, & 0, & 0, & 0, & 0, & 0, & 0, & \cdots & 0, & 0, & 0, & 0, & 0, & 0, & 0, & 0 \\ 0, & 0, & 0, & 1, & 0, & 0, & 0, & 0, & 0, & 0, & 0, & 0, & 0, & 0, & 0, & \cdots & 0, & 0, & 0, & 0, & 0, & 0, & 0, & 0 \\ & & & & & & & & \vdots & & & & & & & & & & & & & & & \\ 0, & 0, & 0, & 0, & 0, & 0, & 0, & 0, & 0, & 0, & 0, & 0, & 0, & 0, & 0, & \cdots & 0, & 0, & 0, & 0, & 0, & 0, & 0, & 1 \end{bmatrix} = 2^6 \times I \quad (5)$$

In a case where both sides of the equation (3) are multiplied by IM, the following equation (6) is obtained. From the equation (6), the following equation (7) representing a reconstructing expression is finally obtained.

[Math. 6]

$$IM \cdot ADC^T = IM \cdot DM \cdot CV^T = 2^6 \times CV^T \quad (6)$$

[Math. 7]

$$CV^T = \frac{1}{2^6} IM \cdot ADC^T \quad (7)$$

That is, according to the M-sequence generator 12, in a case where (i) the matrix of the equation (1) is DM, (ii) the equation (1) is simplified, and (iii) the matrix obtained by replacing the factor '−1' of DM with '0 (zero)' is IM, a product of IM and DM is orthogonal (see the equation (5)).

Use of this property makes it possible to finally obtain the equation (7), so that CV={C80, C79, C78, . . . , C1, Cd47, . . . , Cd1} is found.

A reconstruction matrix IM in the equation (7) has a factor of '0 (zero)' or '1'. Therefore, a reconstructing circuit can be configured to include only adders. That is, the reconstructing circuit does not need to include a subtractor which is necessary in Embodiment 1.

This allows a reduction in calculation amount of the reconstructing circuit, so that a size and electric power consumption of the reconstructing circuit can be reduced.

<M-sequence Reconstructing Circuit>

The following description will discuss the M-sequence reconstructing circuit 48 whose size is reduced as described above.

Figure 21:
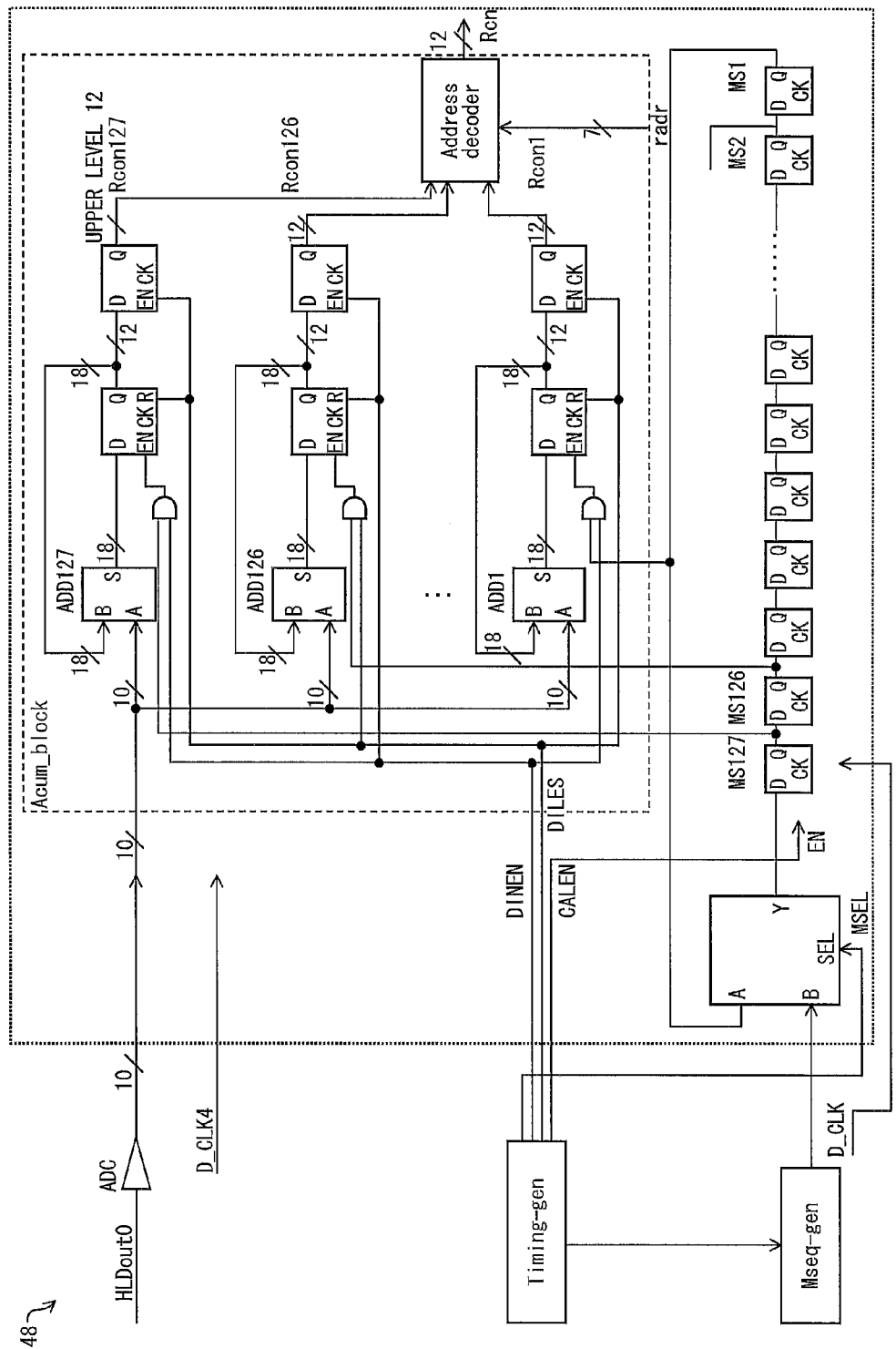
FIG. 21 is an equivalent circuit diagram of an M-sequence reconstructing circuit of the coordinated input device illustrated in FIG. 16.

FIG. 21 is a block diagram schematically illustrating a configuration of the M-sequence reconstructing circuit 48 included in the coordinate input device in accordance with Embodiment 3.

As illustrated in FIG. 21, the M-sequence reconstructing circuit 48 can be configured to include only adders, as compared with the M-sequence reconstructing circuit 18 of Embodiment 1. Therefore, unlike the M-sequence reconstructing circuit 18 of Embodiment 1, the M-sequence reconstructing circuit 48 repeats accumulative calculation so as to calculate 127 pieces of reconstructing data. As in the case of the M-sequence reconstructing circuit 18 of Embodiment 1, an M-sequence signal of K=127 is stored in each of flip-flops MS1 through MS127. In a case where MSEL='0 (zero)', data is shifted rightward at each rise of D_CLK.

In an Acum_block of the M-sequence reconstructing circuit 48, (i) an output Q of a 18-bit flip-flop with EN and R is connected to an 18-bit B input of an adder and (ii) AD-converted 10-bit data HLDout0 is supplied to an A input of the adder.

Further, the output Q of the 18 bit flip-flop with EN and R is connected to a 12-bit flip-flop with EN in a subsequent stage. An output Q of the 12-bit flip-flop in the subsequent stage is supplied to Rcon and then supplied to an address decoder.

The M-sequence reconstructing circuit 48 includes 127 pairs of the adder and the two types of flip-flops. The 127 pairs of the adder and the two types of flip-flops simultaneously carry out output with respect to respective Rcon1 through Rcon127, and one of the 127 pairs is selected by a 7 bit-rade signal supplied to the address decoder so as to be outputted as 12-bit Rcn data.

In a case where DIRES='1', the 18-bit flip-flop is cleared. Only in a case where DINEN and MSXXX are both '1', HLDout0 is added, so that an accumulated value is stored in the 17-bit flip-flop.

The MSXXX is shifted at each rise of D_CLK. Therefore, after calculation for 127 clocks, results of Rcon1 through Rcon127 are obtained as results of M-sequence reconstructing calculation. It is then determined which one of the obtained results of Rcon1 through Rcon 127 is selected by the 7-bit radr signal so as to be outputted.

The operation carried out by the M-sequence reconstructing circuit 48 can be carried out in parallel as described in Embodiment 2. The following description will discuss a parallel M-sequence reconstructing circuit which carries out, in parallel, a process carried out by the M-sequence reconstructing circuit 48.

[Embodiment 4]

The following description will discuss a forth embodiment of the present invention. Note that Embodiment 4 will discuss a parallel M-sequence reconstructing circuit which carries out, in parallel, a process carried out by the M-sequence reconstructing circuit 48 of the configuration of the coordinate input device of Embodiment 1.

Figure 22:
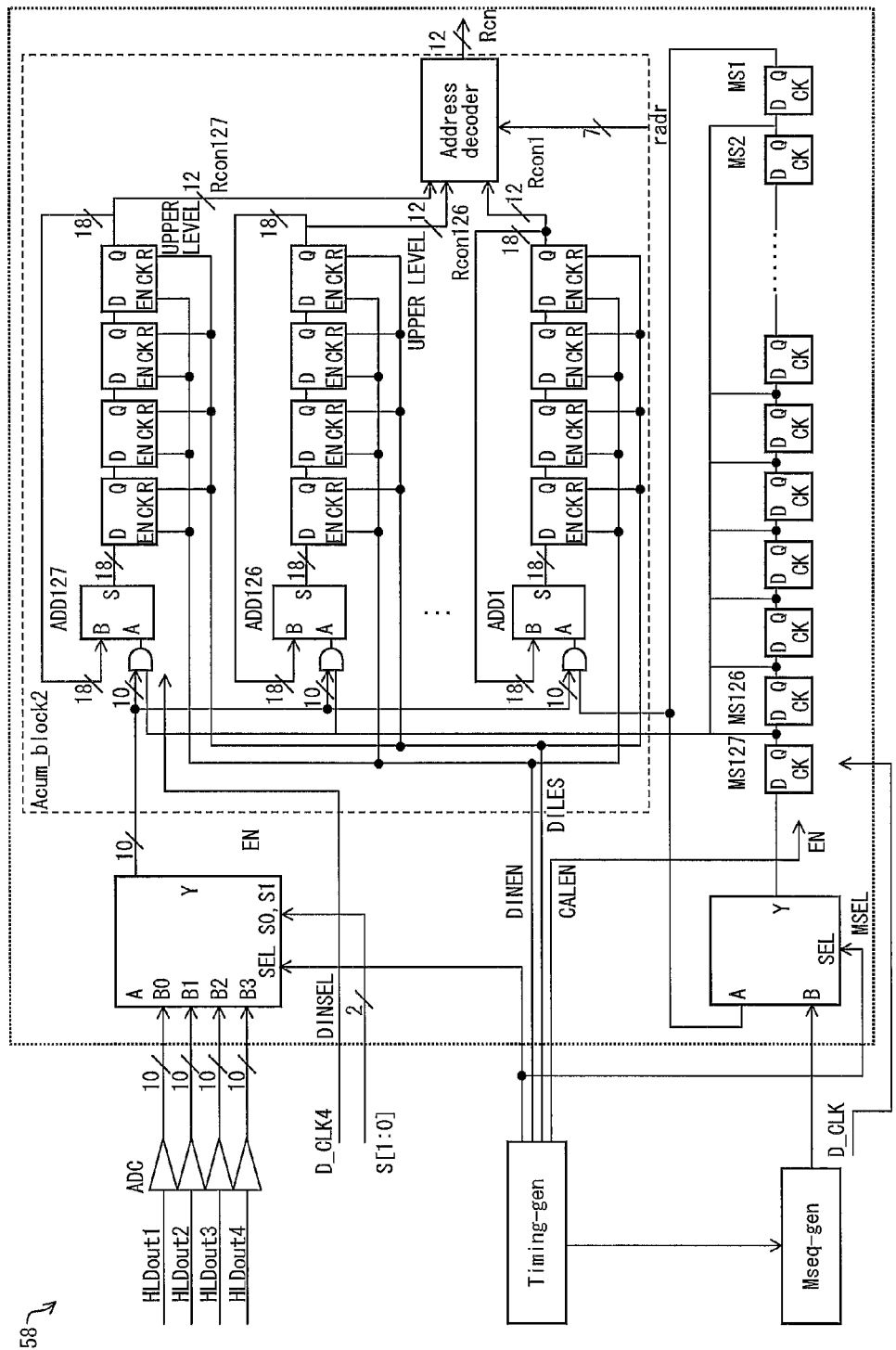
FIG. 22 is an equivalent circuit diagram of an M-sequence reconstructing circuit which carries out an M-sequence reconstructing process in parallel.

FIG. 22 is a brock diagram schematically illustrating a configuration of an M-sequence reconstructing circuit 58 which carries out an M-sequence reconstructing process in parallel. Note here that Embodiment 4 will discuss a case where concurrency is 4.

The M-sequence reconstructing circuit 58 illustrated in FIG. 22 is a reconstructing circuit in which four Acum_blocks are provided so that a time-sharing process can be carried out.

Signals HLDouT1 through HLDouT4 obtained by integrating signals supplied from four receiving electrodes are supplied to a selector. The signals HLDouT1 through HLDouT4 are subjected to selection and specification by S[1:0] and then supplied to the plurality of Acum_blocks as 10-bit data Din. DINEN is a signal which causes the plurality of Acum_blocks to be calculation enable in synchronization with S[1:0]

D_CLK4 is a clock which is four times higher in frequency than D_CLK. S[1:0] and DINEN1 through DINEN4 carry out a time-sharing operation in four phases.

Note that Embodiment 4 describes an example in which D_CLK operates by four time-sharing. However, in a case where D_CLK operates by N time-sharing, it is only necessary to drive S[X:0] by time-sharing in accordance with each of N phases by causing D_CLKN to be N times higher in frequency than D_CLK.

As described above, in a case where the M-sequence reconstructing circuit 58 is configured to include an Acum_block2 in which N stages of the flop-flops having a shift structure are provided, it is easy for the M-sequence reconstructing circuit to have an extended structure for N time-sharing.

As has been described in Embodiment 3, in a case where data is shifted by the shift register and the adders are used while being fixed, a huge number of wires are necessary for switches between the adders and the shift register, which is time-shared. This makes it more difficult to design a layout of the M-sequence reconstructing circuit as N is increased.

In contrast, according to Embodiment 4, it is possible to easily design the layout of the M-sequence reconstructing circuit even in a case of large N time-sharing.

[Embodiment 5]

The following description will discuss a fifth embodiment of the present invention.

Embodiment 5 will discuss a case where drive electrodes are driven at ±V0 and M-sequence reconstructing is carried out by DM having coefficients of 1 and −1. Note that a coordinate input device in accordance with Embodiment 5 has a configuration identical to that of the coordinate input device in accordance with Embodiment 3, except for a configuration of an M-sequence reconstructing circuit.

A relationship between a coupling capacitance CV and AD-converted data is represented by the following equations (8) and (9). In a case where both sides of the equation (9) are multiplied by DM, the following equation (10) is obtained. Note here that the equation (9) is an expression obtained by simplifying the equation (8). Note also that the equation (10) is an expression obtained by reconstructing a reconstruction matrix by DM having the coefficients of ±1.

[Math. 8]

$$\begin{bmatrix} a1 \\ a2 \\ a3 \\ a4 \\ \vdots \\ a127 \end{bmatrix} = \begin{bmatrix} 1, & 1, & 1, & 1, & 1, & 1, & 1, & -1, & -1, & -1, & -1, & -1, & -1, & 1, & \cdots & -1, & -1, & 1, & -1, & 1, & -1, & 1, & -1 \\ 1, & 1, & 1, & 1, & 1, & 1, & -1, & -1, & -1, & -1, & -1, & -1, & 1, & -1, & \cdots & -1, & 1, & -1, & 1, & -1, & 1 & -1, & 1 \\ 1, & 1, & 1, & 1, & 1, & -1, & -1, & -1, & -1, & -1, & -1, & 1, & -1, & -1, & \cdots & 1, & -1, & 1, & -1, & 1, & -1, & 1, & 1 \\ 1, & 1, & 1, & 1, & -1, & -1, & -1, & -1, & -1, & -1, & 1, & -1, & -1, & -1, & \cdots & -1, & 1, & -1, & 1, & -1, & 1, & 1, & 1 \\ & & & & & & & \vdots & & & & & & & & & & & & & & & \\ -1, & 1, & 1, & 1, & 1, & 1, & 1, & 1, & -1, & -1, & -1, & -1, & -1, & -1, & \cdots & -1, & -1, & -1, & 1, & -1, & 1, & -1, & 1 \end{bmatrix} \begin{bmatrix} C80 \\ C79 \\ C78 \\ C77 \\ \vdots \\ C1 \\ Cd47 \\ \vdots \\ Cd1 \end{bmatrix}$$

(8)

[Math. 9]

$$ADC^T = DM.CV^T \tag{9}$$

[Math. 10]

$$DM.ADC^T = DM.DM.CV^T \tag{10}$$

Here, in a case where (i) the equation (10) is represented by IM having factors of 0 and 1 and (ii) DM.DM is transformed, the following equation (11) is obtained. A matrix in the equation (11) is represented by the following equation (12).

[Math. 11]

Here, $$1 = \begin{bmatrix} 1, & 1, & 1, & 1, & \cdots & 1, & 1 \\ 1, & 1, & 1, & 1, & \cdots & 1, & 1 \\ 1, & 1, & 1, & 1, & \cdots & 1, & 1 \\ & & & \vdots & & & \\ 1, & 1, & 1, & 1, & \cdots & 1, & 1 \end{bmatrix} \quad (11)$$

[Math. 12]

$$\begin{aligned} DM.DM &= DM.(2IM - 1) \\ &= 2 \times DM.IM - DM.1 \\ &= 2^7 \times I - 1 \end{aligned} \quad (12)$$

In a case where the equation (11) is substituted for the equation (10), the following equation (13) is obtained. Based on the equation (13), a result is obtained in which an average value of CV is subtracted from a result which is reconstructed by CV.

[Math. 13]

$$\begin{aligned} DM.ADC^T &= 2^7 \times CV^T - 1.CV^T \\ &= 2^7 \times CV^T - (2^7 - 1) \times CV \begin{bmatrix} 1 \\ 1 \\ 1 \\ \vdots \\ 1 \end{bmatrix} \end{aligned} \quad (13)$$

Because a variable component can be widely reduced during a touch or a non-touch with a finger, it is possible to ignore, as a local change in the equation (13), the average value of CV. Therefore, the result which is reconstructed by CV makes it possible to obtain a substantially equal touch function, as compared with a result which is reconstructed by IM.

<M-Sequence Reconstructing Circuit>

The following description will discuss a circuit for carrying out the M-sequence reconstructing process.

Figure 23:
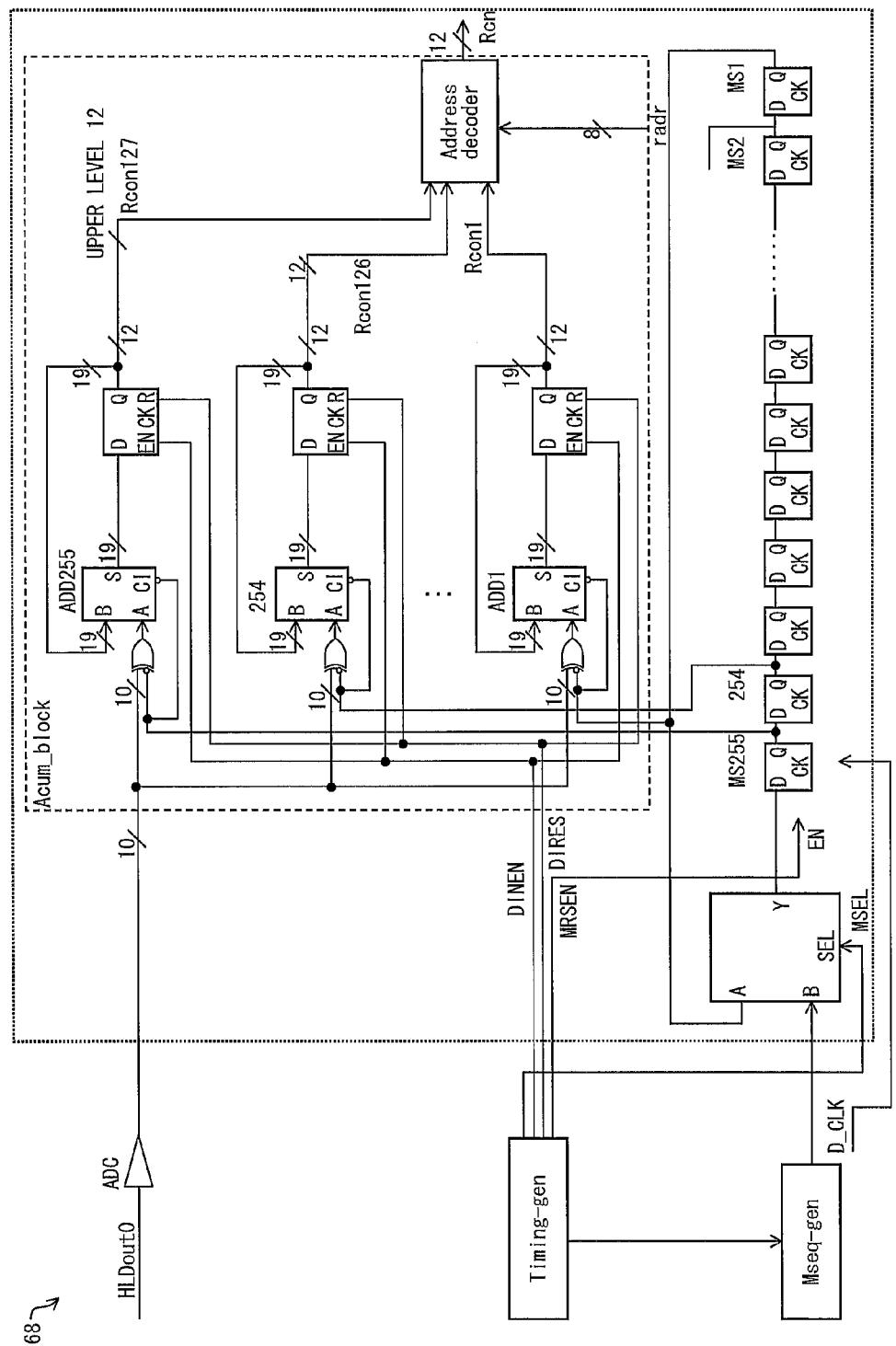
FIG. 23 is an equivalent circuit diagram of an M-sequence reconstructing circuit of a coordinate input device in accordance with an embodiment.

FIG. 23 is a block diagram schematically illustrating a configuration of an M-sequence reconstructing circuit 68 in accordance with Embodiment 5.

As compared with the M-sequence reconstructing circuit 48, the M-sequence reconstructing 68 is configured such that an XOR is provided to an input part of a carry-in (CI) adder (see FIG. 23).

With this configuration, addition/ subtraction corresponding to the coefficients of DM can be carried out with fewer gates.

In a case where an output of each of MS255 through MS1 is '1', an output of an ADC is supplied to the adder without being inversed. Further, no carry-in occurs in the adder. In a case where the output of each of MS255 through MS1 is '0', the output of the ADC is inverted, carry-in occurs in the adder, and addition operation is carried out by handling "0" as a negative number of a two's complement.

Note here that absolute values of the coefficients of DM are all 1. Therefore, a reconstructing signal is finally divided by K+1($2^7$=128), whereas noise included in the reconstructing signal is Sqrt(K)/(K+1) since a noise element is a sum of independent noise of σ. Accordingly, an SN is (K+1)/Sqrt(K) times higher than that of the conventional scanning.

The operation carried out by the M-sequence reconstructing circuit 68 can be carried out in parallel as described in Embodiment 4. The following description will discuss a parallel M-sequence reconstructing circuit which carries out, in parallel, a process carried out by the M-sequence reconstructing circuit 68.

[Embodiment 6]

The following description will discuss a sixth embodiment of the present invention.

Figure 24:
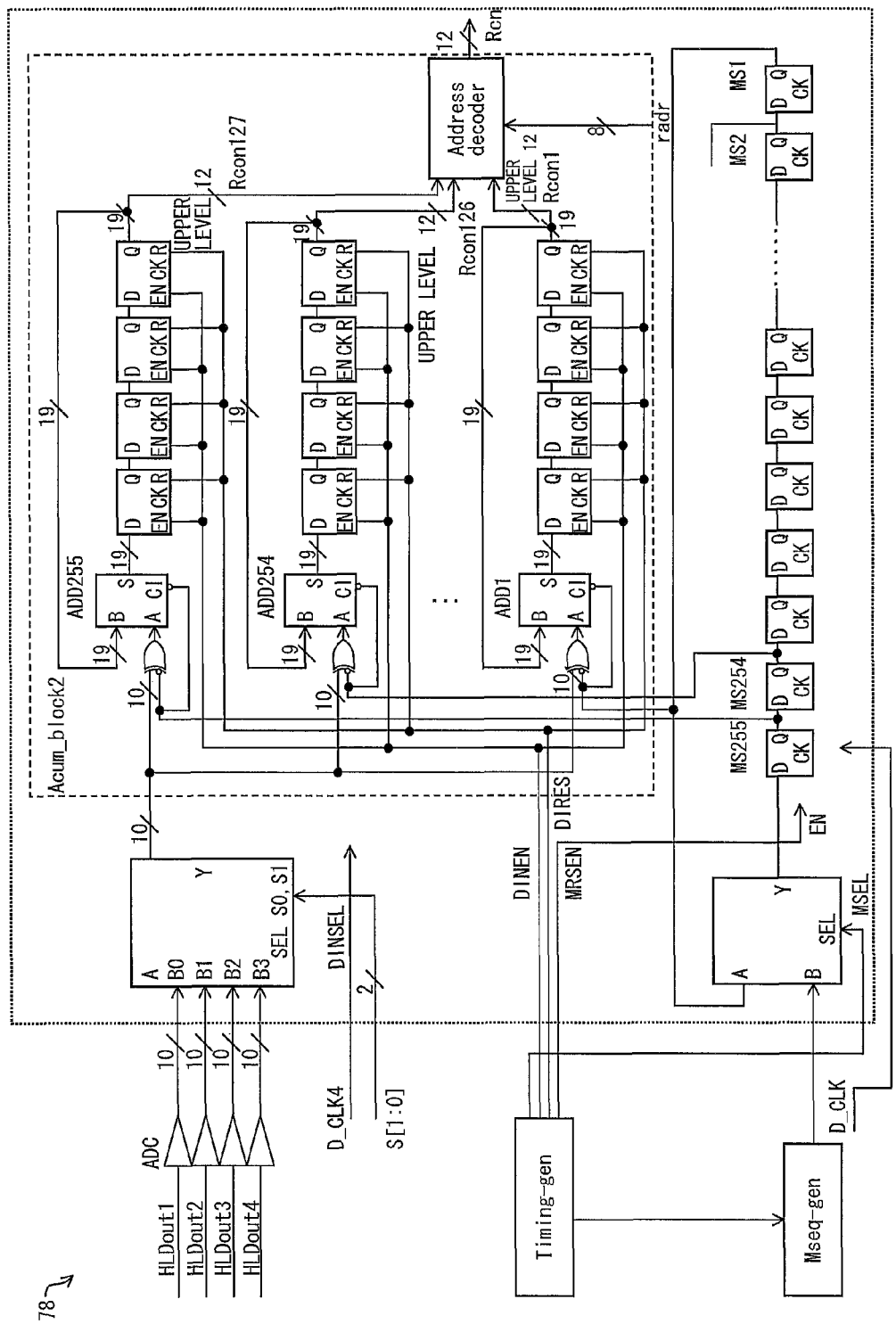
FIG. 24 is an equivalent circuit diagram of an M-sequence reconstructing circuit which carries out an M-sequence reconstructing process in parallel.

FIG. 24 is a block diagram schematically illustrating a configuration of an M-sequence reconstructing circuit 78 which carries out an M-sequence reconstructing process in parallel. Note here that Embodiment 6 will discuss a case where concurrency is 4.

The M-sequence reconstructing circuit 78 illustrated in FIG. 24 is a reconstructing circuit in which four Acum_blocks are provided so that a time-sharing process can be carried out.

Signals HLDouT1 through HLDouT4 obtained by integrating signals supplied from four receiving electrodes are supplied to a selector. The signals HLDouT1 through HLDouT4 are subjected to selection and specification by S[1:0] and then supplied to the plurality of Acum_blocks as 10-bit data Din. DINEN is a signal which causes the plurality of Acum_blocks to be calculation enable in synchronization with S[1:0].

D_CLK4 is a clock which is four times higher in frequency than D_CLK. S[1:0] and DINEN1 through DINEN4 carry out a time-sharing operation in four phases.

Note that Embodiment 6 describes an example in which D_CLK operates by four time-sharing. However, in a case where D_CLK operates by N time-sharing, it is only necessary to drive S[X:0] by time-sharing in accordance with each of N phases by causing D_CLKN to be N times higher in frequency than D_CLK.

As described above, in a case where the M-sequence reconstructing circuit 78 is configured to include the Acum_block2 in which N stages of the flop-flops having a shift structure are provided, it is easy for the M-sequence reconstructing circuit to have an extended structure for N time-sharing.

As has been described in Embodiment 5, in a case where data is shifted by the shift register and the adders are used while being fixed, a huge number of wires are necessary for switches between the adders and the shift register, which is time-shared. This makes it more difficult to design a layout of the M-sequence reconstructing circuit as N is increased.

In contrast, according to Embodiment 6, it is possible to easily design the layout of the M-sequence reconstructing circuit even in a case of large N time-sharing.

[Embodiment 7]

Embodiments 1 through 6 have discussed the examples in each of which a computing unit in the form of hardware is used as the M-sequence reconstructing circuit 18 (28, 38, 48, 58, 68, or 78). According to another embodiment, the M-sequence reconstructing circuit can be replaced with a CPU, provided that the CPU can practically carry out reconstructing operation based on the equation (7).

<Effects of Invention>

The following description will discuss, with reference to FIGS. 25 through 29, effects brought about by the embodiments.

(a) of FIG. 25 is a view for explaining effects of the present invention which are obtained in a case where 80 drive electrodes are provided. (b) of FIG. 25 is a view for explaining effects of the present invention which are obtained in a case where 127 drive electrodes are provided.

According to Embodiments 1 and 2, voltages applied to the 80 drive electrodes are a GND and V0 potential corresponding to '0 (zero)' and '1', respectively, of a M-sequence. The number Mn of the drive electrodes which number corresponds to V0 is represented by the following equation (14).

[Math. 14]

$$Mn = \sum_{l=1}^{80} M\text{-}seq \quad (14)$$

Mn, calculated based on the equation (14) in a case where the M-sequence is rotated leftward, is a magnification of a mutual capacitance of one cross, and is equal to C1 (see C1 shown in FIGS. 26 and 27).

Meanwhile, according to Embodiments 3 and 4, voltages applied to the 80 drive electrodes are −V0 potential and V0 potential corresponding to '0 (zero)' and '1', respectively, of the M-sequence. The number Mbn of the drive electrodes which number corresponds to −V0 is represented by the following equation (15).

[Math. 15]

$$Mbn = \frac{80}{\sum_{l=1}^{} M\text{-}seq} \quad (15)$$

Note here that, in a case where a touch panel includes the 80 drive electrodes and a cycle of the M-sequence is K-127, C1 of Embodiment 1 ranges from 34 to 46, and C1-C3 of Embodiment 2 ranges from −12 to 12 (see FIG. 26).

In a case where the touch panel includes the 127 drive electrodes and the cycle of the M-sequence is K-127, C1-C3 of Embodiment 2 has a minimum value (1).

As described above, in a case where the drive electrodes are driven by V0 or −V0 in accordance with a pattern of the M-sequence, it is possible to (i) reduce a feedback capacitance of a coupling capacitance measuring circuit, (ii) reduce a chip area of a detection IC, and (iii) increase an SN.

Further, the following description will discuss, with reference to FIGS. 28 and 29, a difference in effect between a case where receiving electrodes are divided into blocks and a case where the receiving electrodes are not divided into blocks.

FIG. 28 is a view illustrating an overall configuration of a coordinate input device in which receiving electrodes of the present invention are divided into two blocks.

FIG. 29 is a view illustrating, as a comparative example, an overall configuration of a coordinate input device in which receiving electrodes are not divided into blocks.

Note here that each of the coordinate input devices illustrated in FIGS. 28 and 29 includes 80 drive electrodes.

According to the comparative example illustrated in FIG. 29, a scan time 80×100 clocks is equal to 8000 clocks. In contrast, according to the present invention illustrated in FIG. 28, a scan time 80+127×50 is equal to 6430 clocks.

Meanwhile, in a case where an SN of a detection signal of the comparative example illustrated in FIG. 29 is SN=1, a result of simulation shows that the SN of the detection signal of the present invention illustrated in FIG. 28 is SN=5.63 times higher than that of the comparative example. In view of a detection time, SN/Sqrt(t) is 1/Sgt(8000) according to the comparative example, whereas SN/Sqrt(t) is 5.63/Sqrt(6430) according to the present invention. This yields an effect such that the present invention allows an improvement in performance of the coordinate input device by 6.28 times as compared with the coordinate input device of the comparative example.

Further, according to the coordinate input devices described in the embodiments, it is possible to sufficiently increase the SN of the detection signal. This causes no problem such that practical detection accuracy cannot be obtained because a signal which is received by a sensor is so small that the detection signal is buried in electric field noise or thermal noise radiated from another device.

Furthermore, in a case where the coordinate input device is applied to a touch panel, the SN of the detection signal can be sufficiently obtained. This yields an effect of carrying out, with no problem, a hover operation serving as an extended function of a tough panel, and a finger direction detecting function.

In addition, according to a touch panel which is larger in size, it is possible to obtain a sufficient detection speed because a process is carried out in parallel. This yields an effect of putting a large touch panel into practical use.

Furthermore, according to a touch panel in which a pen having a electroconductive electrode whose tip has an area smaller than that of a finger is used and a pitch between a drive electrode and a receiving electrode is narrowed so that a resolution can be obtained, it is possible to carry out coordinate detection with high accuracy, at a high speed, and with a high SN.

<Division Number of Blocks of Receiving Electrodes>

The embodiments have mainly described the examples of measuring two coupling capacitances in parallel by dividing the receiving electrode group into two blocks. However, the present invention is not limited to the embodiments. The number of blocks into which the receiving electrode group is divided can be changed as necessary.

Note here that the following description will discuss points which should be considered in changing the number of blocks into which the receiving electrodes is divided.

Assume (i) that a relationship between (a) a stray capacitance between a drive electrode and a shield and (b) a time constant of a resistance of the drive electrode is expressed by Td=Rd×Cd and (ii) that a relationship between (c) a stray capacitance between a receiving electrode and the shield and (d) a time constant of the receiving electrode is expressed by Tr=Rr×Cr. In this case, in order to measure a crossover capacitance between the drive electrode and the receiving electrode, a detection time of approximately 3×Td is required on a drive electrode side, and a detection time of approximately 3×Tr is required during integration.

It follows that a time required to measure one intersection is Tmes=3×(Td+Tr)×(1+a). In a case of a standard 5-inch panel including diamond electrodes, a capacitance and a resistance are approximately 25 pF and 18 kΩ respectively, though the capacitance and the resistance vary depending on a panel size. Assuming that Td≈Tr≈0.45 μsec and a=2, Tems=2.7 μsec. An integrator renews, for each Tems, a voltage proportional to the crossover capacitance, and holds the voltage. The held voltage is digitalized by an AD converter. An AD converter having a frequency of 20 MHz to 50 MHz at which AD conversion is carried out can be used as a macro for 10- to 12-bit sequential parallel AD conversion.

In a case where the AD converter carries out AD conversion at a frequency of 20 MHz, it is possible to divide the receiving electrode group into 2.7 μsec×20×106=54 blocks.

Further, in a case of a 10-inch-class panel, both C and R double as compared with those of the 5 inch panel, and the time constants Td and Tr, and the measuring time Tems accordingly quadruple as compared with those of the 5 inch panel. Therefore, in a case where the AD converter carries out AD conversion at a frequency of 20 MHz, it is possible to divide the receiving electrode group into 2.7×4 μsec×20×106=216 blocks.

In a case where an AD converter carries out AD conversion at such a frequency, the coordinate input device can be configured as below. In a case where the receiving electrode group is divided into a maximum number of blocks, an integrating circuit is provided for each of the receiving electrodes so that a voltage is sampled and held, and the voltage is digitalized by one AD converter by time-sharing, so that the coordinate input device can subject digital M-sequence reconstructing calculation to a time-sharing process.

A practical restriction in increasing a panel size is that Tmes×the number of intersections<1/60 is satisfied so that a coordinate frame rate is not less than 60 MHz. ITO has a substantially fixed time constant while maintaining transparency. It follows that the time constant determines a size restriction.

As described above, the number of the blocks into which the receiving electrode group is divided can be determined as appropriate in view of various matters such as a panel size.

The drive electrode driving circuit is preferably arranged such that the drive electrode driving circuit applies a given voltage to each of the drive electrodes in a case where the pseudorandom signal is at a high level; and the drive electrode driving circuit applies zero voltage to each of the drive electrodes in a case where the pseudorandom signal is at a low level.

In this case, it is possible to detect the intersections, the number of which corresponds to that of the high level of the pseudorandom signal, during one clock cycle.

The coordinate input device is preferably arranged such that the drive electrode driving circuit applies a given voltage to each of the drive electrode in a case where the pseudorandom signal is at a high-level; and the drive electrode driving circuit applies, to each of the drive electrodes, a voltage with reverse polarity to the given voltage in a case where the pseudorandom signal is at a low level.

In this case, it is possible to detect the intersections, the number of which corresponds to that of the high level and the low level of the pseudorandom signal, during one clock. With this configuration, a signal, obtained from a mutual capacitance between all of the drive electrodes and a selected one of the receiving electrodes, is measured as a coupling capacitance.

Further, the coordinate input device preferably includes a pseudorandom signal reconstructing means for reconstructing an output from each of the detecting means to an original pseudorandom signal, the pseudorandom signal reconstructing means reconstructing, by time-sharing, the output from the each of the detecting means, the output being sequentially outputted for each of the N blocks.

In this case, since the pseudorandom signal reconstructing means reconstructs, by time-sharing, the output from each of the detecting means, which output is sequentially outputted for each of the N blocks, a reduction in calculation amount is realized as compared with a case where the output is not reconstructed by time-sharing but reconstructed at a time. This allows a size of the pseudorandom signal reconstructing means to be reduced. Specifically, it is preferable that the coordinate input device includes a storing section which corresponds to each of the N blocks and in which a detection result is temporarily stored, as below.

That is, the coordinate input device is preferably arranged such that the detecting means each include: a coupling capacitance measuring circuit which measures the coupling capacitance received by the receiving electrode selecting circuit; and a storage section which temporarily stores, as a detection result, the coupling capacitance measured by the coupling capacitance measuring circuit, and the detection result is supplied to the pseudorandom signal reconstructing means while the N blocks, each corresponding to the detection result, are being switched to one another, the detection result being stored in the storage section of the each of the detecting means in time series.

Further, the coordinate input device preferably includes a pseudorandom signal reconstructing means for reconstructing an output from each of the detecting means to an original pseudorandom signal, the pseudorandom signal reconstructing means reconstructing, in parallel, the output from the each of the detecting means, the output being outputted for each of the N blocks.

In this case, since reconstruction of the pseudorandom signal is carried out in parallel for each of the N blocks, it is possible to speed up a reconstructing process. That is, it is possible to considerably reduce a time required to detect a coordinate position.

The coordinate input device having the configuration can be employed for various electronic devices. For example, the coordinate input device can be employed as a touch panel provided on a display panel. Further, the coordinate input device can be employed as an input interface of various electronic devices.

The coordinate input device in accordance with the present invention is applicable, as an electronic device provided with a touch panel, to a mobile phone, a smartphone, a PDA, an electronic book reader, a tablet PC, a digital signage (electronic advertisement), and the like.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is applicable to a general electronic device provided with a touch panel.

Reference Signs List

11 Sensor section
12 M-sequence generator (pseudorandom signal generating means)
13 Drive electrode driving circuit
14 Receiving electrode selecting circuit
14a First receiving electrode selecting section
14b Second receiving electrode selecting section
15 First detecting section (detecting means)
16 Second detecting section (detecting means)
18 M-sequence reconstructing circuit (pseudorandom signal reconstructing means)
22 M-sequence generator (pseudorandom signal generating means)
23 Drive electrode driving circuit
28 M-sequence reconstructing circuit (pseudorandom signal reconstructing means)
38 M-sequence reconstructing circuit (pseudorandom signal reconstructing means)
48 M-sequence reconstructing circuit (pseudorandom signal reconstructing means)
58 M-sequence reconstructing circuit (pseudorandom signal reconstructing means)
D1 through D80: Drive electrode group
S1 through S100: Receiving electrode group

The invention claimed is:

1. A coordinate input device comprising:
a drive electrode group composed of drive electrodes which are arranged on a substrate at regular intervals;
a receiving electrode group composed of receiving electrodes which are arranged at regular intervals so as to be insulated from and intersect with the drive electrodes;
a pseudorandom signal generating means for generating a pseudo-random signal having a pulse-like autocorrelation function;
a drive electrode driving circuit which sequentially applies, to each of the drive electrodes, a voltage synchronized with a cycle of the pseudorandom signal;
a receiving electrode selecting circuit which is connected to the receiving electrode group and receives a value corresponding to a coupling capacitance obtained by capacitive coupling between the drive electrode group and the receiving electrode group;

detecting means for detecting an inputted coordinate position in accordance with the value received by the receiving electrode selecting circuit; and a pseudorandom signal reconstructing means for reconstructing an output from each of the detecting means to an original pseudorandom signal, wherein the receiving electrode group being divided into N blocks (N is a positive number not less than two), and the N blocks being provided with the respective detecting means, the pseudorandom signal reconstructing means reconstructing, by time-sharing, the output from the each of the detecting means, the output being sequentially outputted for each of the N blocks, the detecting means each include:
- a coupling capacitance measuring circuit which measures the coupling capacitance received by the receiving electrode selecting circuit; and
- a storage section which temporarily stores, as a detection result, the coupling capacitance measured by the coupling capacitance measuring circuit, and the detection result is supplied to the pseudorandom signal reconstructing means while the N blocks, each corresponding to the detection result, are being switched to one another, the detection result being stored in the storage section of the each of the detecting means in time series.

2. The coordinate input device as set forth in claim 1, wherein the drive electrode driving circuit applies a given voltage to each of the drive electrodes in a case where the pseudorandom signal is at a high level.

3. The coordinate input device as set forth in claim 1, wherein:
- the drive electrode driving circuit applies a given voltage to each of the drive electrodes in a case where the pseudorandom signal is at a high level; and
- the drive electrode driving circuit applies, to each of the drive electrodes, a voltage with reverse polarity to the given voltage in a case where the pseudorandom signal is at a low level.

4. An electronic device comprising:
a coordinate input device as set forth in claim 1.

* * * * *